(12) United States Patent
Roth et al.

(10) Patent No.: US 10,861,102 B2
(45) Date of Patent: Dec. 8, 2020

(54) ASSET RECONFIGURATION AND REASSIGNMENT COMMUNICATION SYSTEM AND COMPONENTS THEREOF

(71) Applicant: 2BC Innovations, LLC, Barrington, IL (US)

(72) Inventors: Thomas H. Roth, Inverness, IL (US); Peter M. Shannon, III, Western Springs, IL (US); Gary W. Grube, Barrington Hills, IL (US)

(73) Assignee: 2BC Innovations, LLC, Barrington, IL (US)

( * ) Notice: Subject to any disclaimer, the term of this patent is extended or adjusted under 35 U.S.C. 154(b) by 255 days.

(21) Appl. No.: 15/997,898

(22) Filed: Jun. 5, 2018

(65) Prior Publication Data

US 2018/0357725 A1    Dec. 13, 2018

Related U.S. Application Data

(60) Provisional application No. 62/517,381, filed on Jun. 9, 2017.

(51) Int. Cl.
*G06Q 40/06* (2012.01)
*G06Q 40/08* (2012.01)

(52) U.S. Cl.
CPC .............. *G06Q 40/08* (2013.01); *G06Q 40/06* (2013.01)

(58) Field of Classification Search
CPC ............................... G06Q 40/06; G06Q 40/08
USPC ............................................................ 705/4
See application file for complete search history.

(56) References Cited

U.S. PATENT DOCUMENTS

| | | | |
|---|---|---|---|
| 6,963,852 B2 | 11/2005 | Koresko | |
| 7,519,552 B2 | 4/2009 | Phelps | |
| 7,752,062 B1 * | 7/2010 | Martin | G06Q 40/08 705/4 |
| 7,769,607 B2 | 8/2010 | Phelps | |
| 7,885,837 B1 | 2/2011 | Martin | |
| 8,005,739 B1 | 8/2011 | Reddy | |
| 8,005,741 B2 | 8/2011 | Jenkins | |
| 8,533,087 B2 | 9/2013 | Lyons | |
| 8,566,206 B2 | 10/2013 | Stolerman | |
| 8,626,649 B1 * | 1/2014 | Bent | G06Q 40/06 705/39 |

(Continued)

*Primary Examiner* — Robert R Niquette
*Assistant Examiner* — Liz P Nguyen
(74) *Attorney, Agent, or Firm* — Garlick & Markison; Gary W. Grube

(57) ABSTRACT

A method begins by a computing device determining desired financial attributes of a legacy financial system, where the legacy financial system is supported by a legacy asset base, where the legacy asset base includes a plurality of legacy assets associated with a plurality of legacy asset types. The method continues with the computing device selecting, in accordance with the desired financial attributes, a subset of augmenting assets from a plurality of available augmenting assets to produce an augmenting asset bundle, where each available augmenting asset is associated with a future time-estimated benefit payment and a series of time-certain obligated payments. The method continues with the computing device determining, in accordance with the desired financial attributes, a first portion of an aggregate of the future time-estimated benefit payments of the augmenting asset bundle for assignment to the legacy asset base.

18 Claims, 27 Drawing Sheets

(56) References Cited

U.S. PATENT DOCUMENTS

| | | | |
|---|---|---|---|
| 8,725,618 B1 | 5/2014 | Menzer | |
| 2006/0178954 A1* | 8/2006 | Thukral | ........ G06Q 50/26 705/28 |

* cited by examiner

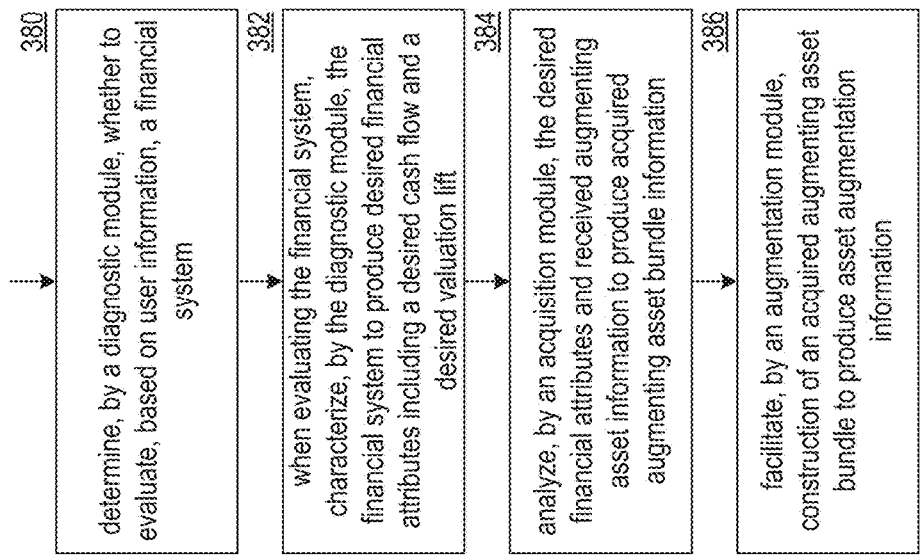

ASSET RECONFIGURATION AND REASSIGNMENT COMMUNICATION SYSTEM AND COMPONENTS THEREOF

CROSS REFERENCE TO RELATED PATENTS

The present U.S. Utility patent application claims priority pursuant to 35 U.S.C. § 119(e) to U.S. Provisional Application 62/517,381, entitled "ASSET RECONFIGURATION AND REASSIGNMENT COMMUNICATION SYSTEM AND COMPONENTS THEREOF," filed Jun. 9, 2017, which is hereby incorporated herein by reference in its entirety and made part of the present U.S. Utility patent application for all purposes.

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

BACKGROUND OF THE INVENTION

Technical Field of the Invention

This invention relates generally to communication systems and more particularly to asset reconfiguration and reassignment within the communication system.

Description of Related Art

Communication systems are known to communicate data between communication devices of the communication system. The data may be communicated in one or more of an unaltered form (e.g., raw data from a first communication device), in an altered form to provide enhanced transmission reliability (e.g., error encoded), in an altered form to provide enhanced security of access (e.g., credentialed access, encryption), and in an altered form to enhance communication resource utilization (e.g., compression). The data may represent a wide variety of data types including one or more of video, audio, text, graphics, and images. Text data is widely known to represent text character documentation, financial documents of numerical nature, and/or a combination thereof.

Global enterprise operations are increasingly utilizing communication systems to communicate representations of financial affairs. Financial documents associated with the financial affairs may include advertisements, solicitations, asset pricing information, purchase orders, invoices, payment transactions, asset distribution information, complex settlement information, financing information, financial market information, asset titling information, transaction guarantee information, global finance trend analysis information, and other information associated with the increasingly complex world of electronic commerce.

The global velocity of data communication and massive volume of data representing financial documents is ever-increasing and as a result it is a growing challenge to communicate, manipulate, and enhance the data related to financial affairs. Such challenges include refreshing an asset base of the financial system (e.g., including detecting growing issues with regards to desired funding levels of the financial system), unlocking untapped asset value (e.g., conversion of one asset type to another), and rapidly retitling new or re-spun assets (e.g., assigning new assets, reassigning converted assets).

BRIEF DESCRIPTION OF THE SEVERAL VIEWS OF THE DRAWING(S)

FIG. 12B is a logic diagram of another example of a method of updating an acquired augmenting asset bundle in accordance with the present invention;

DETAILED DESCRIPTION OF THE INVENTION

Figure 1:
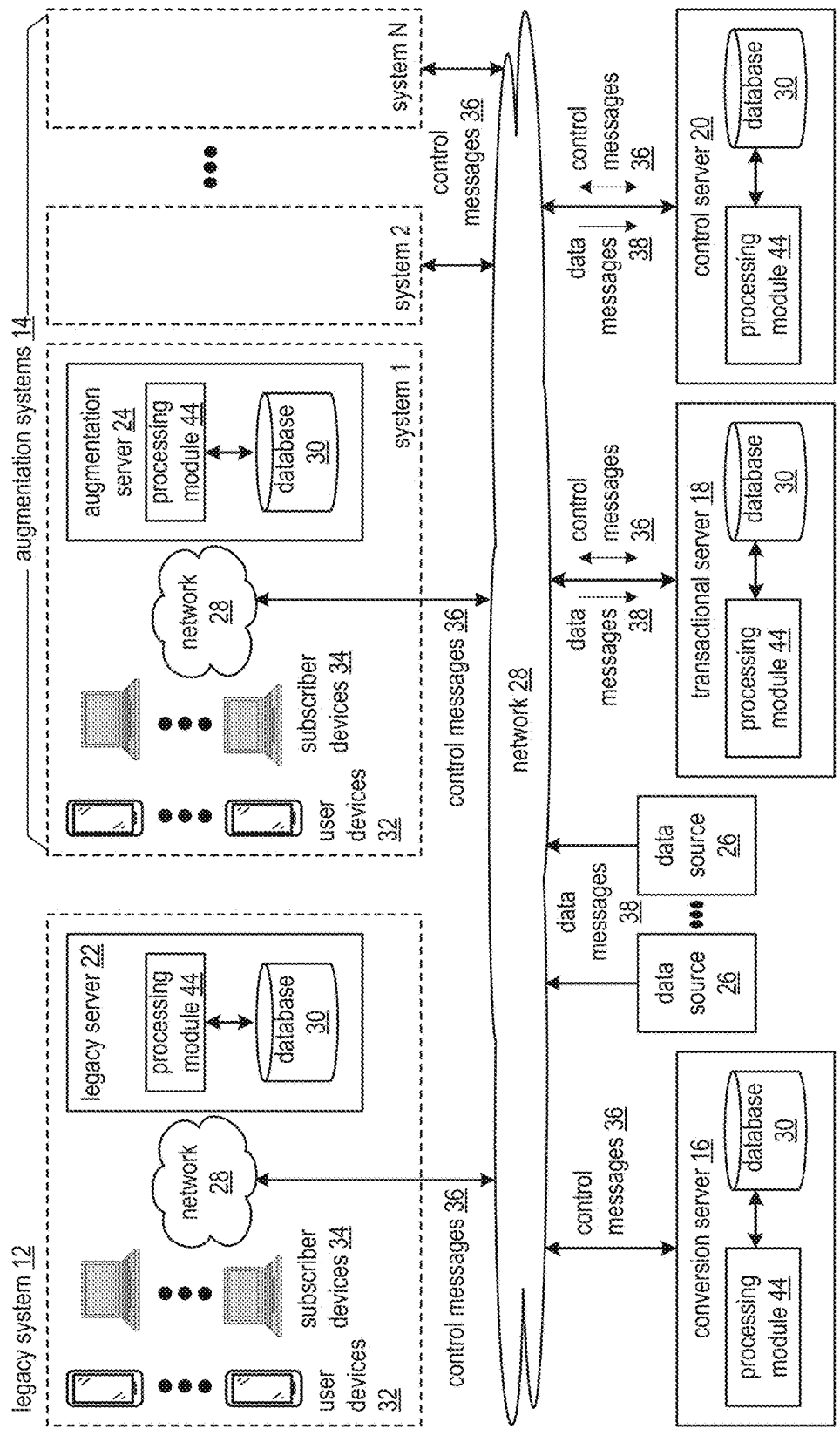
FIG. 1 is a schematic block diagram of an embodiment of a communication system in accordance with the present invention.

FIG. 1 is a schematic block diagram of an embodiment of a communication system 10 that includes a legacy system 12, a plurality of N augmentation systems 14, a conversion server 16, a transactional server 18, a control server 20, one or more data sources 26, and a network 28. Alternatively, the communication system 10 may include any number of legacy systems 12 and any number of servers 16-20.

The legacy system 12 includes a plurality of user devices 32, a plurality of subscriber devices 34, a portion of the network 28, and a legacy server 22. Each user device 32 may be implemented utilizing one or more portable communication devices. Examples of portable communication devices include a smart phone, a basic cell phone, a Wi-Fi communication device, a satellite phone, and/or any other device that includes a computing core (e.g., providing processing module functionality), one or more wireless modems, sensors, and one or more user interfaces, and is capable of operating in a portable mode untethered from a fixed and/or wired network. For example, a particular user device 32 is implemented utilizing the smart phone, where the smart phone is utilized by a user associated with the legacy system 12. At least some of the user devices 32 are capable to communicate data encoded as wireless communication signals and/or wireless location signals with the portion of the network 28 associated with the legacy system 12 and/or directly or indirectly to other user devices 32 and/or to at least some of the subscriber devices 34.

Each subscriber device 34 may be implemented utilizing one or more computing devices. Examples of portable computing devices includes a laptop computer, a tablet computer, a handheld computer, a desktop computer, a cable television set-top box, an application processor, an internet television user interface, and/or any other device that includes a computing core a (e.g., providing the processing module functionality), one or more modems, sensors, and one or more user interfaces. For example, a particular subscriber device 34 is implemented utilizing the laptop computer, where the laptop computer is utilized by a subscriber associated with the legacy system 12. The subscriber devices 34 are capable to communicate data that is encoded into wireless and/or wired communication signals via the portion of the network 28 associated with the legacy system 12 and/or directly or indirectly to other subscriber devices 34 and/or to at least some of the user devices 32.

The components of the communication system 10 are coupled via the network 28, which may include one or more of wireless and/or wireline communications networks, one or more wireless location networks, one or more private communications systems, a public Internet system, one or more local area networks (LAN), and one or more wide area networks (WAN). For example, the network 28 is implemented utilizing the Internet to provide connectivity between the legacy system 12, the plurality of augmentation systems 14, the one or more data source 26, and the servers 16-20. The wireless location networks communicate wireless location signals with the user devices 32. Each wireless location network may be implemented utilizing one or more of a portion of a global positioning satellite (GPS) satellite constellation, a portion of a private location service, a wireless local area network (WLAN) access point, a Bluetooth (BT) beacon and/or communication unit, and a radiofrequency identifier (RFID) tag and/or transceiver. Each wireless location network generates and transmits the wireless location signals in accordance with one or more wireless location industry standards (e.g., including synchronize timing information (i.e., GPS), and a geographic reference identifier (ID) (i.e., a beacon ID, a MAC address, an access point ID such as a wireless local area network SSID)).

The wireless communication networks of the network 28 include one or more of a public wireless communication network and a private wireless communication network and may operate in accordance with one or more wireless industry standards including 5G, 4G, universal mobile telecommunications system (UMTS), global system for mobile communications (GSM), long term evolution (LTE), wideband code division multiplexing (WCDMA), and IEEE 802.11. For example, a first user device 32 communicates data encoded as wireless communication signals with a 4G public wireless communication network of the network 28 and a second user device 32 communicates data encoded as wireless communication signals with a Wi-Fi wireless communication network of the network 28.

The legacy server 22 includes at least one processing module 44 and at least one database 30. The processing module 44 processes control messages 36 and data messages 38 via the network 28 with one or more of the user devices 32, the subscriber devices 34, the augmentation systems 14, the data sources 26, the conversion server 16, a transactional server 18, and the control server 20. The processing module 44 further stores and retrieves data in the database 30. The processing module 44 is discussed in greater detail with respect to FIGS. 2-3 and the database 30 is discussed in greater detail with reference to FIG. 3.

Each augmentation system 14 includes another plurality of user devices 32, another plurality of subscriber devices 34, another portion of the network 28, and an augmentation server 24. The augmentation server 24 includes another processing module 44 and another database 30. Each of the conversion server 16, the transactional server 18, and the control server 20 includes another processing module 44 and another database 30.

Each data source 26 may be implemented utilizing one or more of a server, a subscription service, a website data feed, or any other portal to data messages 38 that provide utility for operation of the communication system 10. Further examples of the data source 26 includes one or more of a financial market server, a census server, a government record server, another transactional server, another control server, another conversion server, another legacy server, a weather service, a screen scraping algorithm, a website, another database, a schedule server, a live traffic information feed, an information server, a service provider, and a data aggregator. The data messages 38 includes one or more of live financial market information, historical financial market information, weather information, a user daily activity schedule (e.g., a school schedule, a work schedule, a delivery schedule, a public transportation schedule), real-time traffic conditions, a road construction schedule, a community event schedule, address of residence information, user lifestyle information (e.g., smoker, non-smoker, physical activities, etc.), user death records, mortality tables, and other information associated with a user.

In general, and with respect to the asset reconfiguration and reassignment within the communication system 10, the communication system 10 supports three primary functions. The three primary functions include: 1) determining desired financial attributes of a financial system (e.g., supported by an underperforming legacy asset base), 2) facilitating acquisition of an augmenting asset bundle to enhance the financial system (e.g., enhancing and/or replacing the legacy asset base, and 3) facilitating the enhancement of the financial system utilizing the augmenting asset bundle such that the financial system substantially achieves the desired financial attributes. The communication system 10 may perform one or more of the three primary functions to provide the asset reconfiguration and reassignment.

The financial system is associated with the legacy system 12 where a plurality of users of the user devices 32 and the subscriber devices 34 are investors/beneficiaries of the legacy asset base supporting the financial system. The plurality of users may include thousands, hundreds of thousands, or even millions of users. The financial system includes any system to derive value for the plurality of users (e.g., balance sheet value and/or cash flow value) from the legacy asset base. Examples of the financial system includes a money market, a bond fund, a hedge fund, a pension system, and a stock fund. The desired financial attributes include one or more of present and future values of the legacy asset base, cash flows enabled by the legacy asset base, ongoing costs associated with the financial system, and return on investment levels for the legacy asset base. The legacy asset base may include thousands, hundreds of thousands, or even millions of individual assets, where assets may include tangible hard assets (e.g., property title, precious metals, commodities, etc.) and monetary assets (e.g., bonds, stocks, life insurance policies.

The augmenting asset bundle includes a bundle of selected assets acquired from one or more of the augmentation systems 14, where candidate assets associated with the augmentation systems 14 includes thousands, hundreds of thousands, and even millions of assets. The assets are selected such that when combined or replacing assets of the legacy assets, the desired financial attributes of the financial system can substantially be reached. The facilitating of the enhancement of the financial system utilizing the augmenting asset bundle manipulates (e.g., splits, un-bundles, transforms, re-bundles, retitles, etc.) the selected assets for combination with or the replacement of assets of the legacy asset base.

The first primary function includes the communication system 10 determining desired financial attributes of a financial system. In an example of operation where the financial system of the legacy system 12 is a pension system for over 100,000 pensioners, the legacy asset base includes assets that are a combination of cash and bonds, and the augmentation systems 14 lists millions of available life insurance policies, the processing module 44 of the control server 20 determines to evaluate the financial system. For example, the control server 20 receives, via the network 28, a control message 36 from the conversion server 16, where the control message 36 includes a request to address underperformance of the legacy asset base associated with the legacy system 12. Having determined to evaluate the financial system, the control server 20 characterizes the financial system to produce a desired cash flow and desired valuation improvement or left for the legacy asset base. For example, the control server 20 receives, via the network 28, another control message 36 from the legacy server 22 that includes information associated with the financial system, and evaluates the information associated with the financial system to determine the desired cash flow and desired valuation lift. The first primary function is discussed in greater detail with reference to FIGS. 5A-5B.

The second primary function includes the communication system 10 facilitating acquisition of an augmenting asset bundle to enhance the financial system. In an example of operation, the processing module 44 of the control server 20 accesses augmenting asset information to extract candidate asset characteristics and down selects candidate assets that compare favorably to augmenting asset preferences. The candidate asset characteristics includes one or more of asset identifier (ID), asset type (e.g., stock, bond, life insurance policy, tangible asset), estimated fair market value (FMV) of the asset, purchase price of the asset, a risk level associated with the asset, a risk level associated with the particular augmentation system tied to the asset, associated liabilities (e.g., premium payments), associated payouts (e.g., a death benefit of an insurance policy), estimated payout timing (e.g., estimated year of a life insurance death benefit payout), an estimated return on investment (ROI) level, and demographics of entities associated with the asset (e.g., age and other characteristics of an insured person associated with an insurance policy). The augmenting asset preferences includes one or more of a maximum desired risk level associated with the asset, a maximum desired risk level associated with the augmentation system tied to the asset, a maximum liability level, a minimum payout level, a minimum ROI level, and one or more preferred demographics of the entities associated with the asset. For example, the control server 20 receives control messages 36 from one or more of the augmentation servers 24, where the control messages 36 includes the candidate asset characteristics, and receives further control messages 36 from the conversion server 16, where the further control messages 36 includes the augmenting asset preferences.

Having obtained the candidate asset characteristics and the augmenting asset preferences, the control server 20 searches through available assets of the one or more augmentation systems 14 to down select the candidate assets that compare favorably to the augmenting asset preferences. For example, the control server 20 exchanges control messages 36 with the augmentation server of each of the one or more augmentation systems 14 to identify each available asset, compares the asset characteristics of the available asset to the augmenting asset preferences, and identify assets where the comparison is favorable (e.g., estimated ROI greater than minimum desired ROI, estimated risk level lower than maximum desired risk level, etc.) to produce the down selected candidate assets.

Having identified the down selected candidate assets, the control server 20 determines a financial contribution of each of the down selected candidate assets. For example, the control server 20 estimates a balance sheet contribution (e.g., a portion of the desired lift) and a cash flow contribution (e.g., a portion of the desired cash flow) for each down selected candidate asset based on the candidate asset characteristics. The control server 20 may produce the estimates based on the down selected candidate assets in an un-altered form and may produce further estimates based on altered forms of the down selected candidate assets, where each of the altered down selected candidate assets are reconfigured. The reconfiguring of a plurality of assets (e.g., selected candidate assets) includes the deconstruction of each of the assets into deconstructed asset elements of two or more element types in accordance with a deconstruction approach and re-bundling pluralities of deconstructed asset elements into two or more new asset bundles in accordance with a re-bundling approach to substantially satisfied the desired cash flow and desired valuation lift of the financial system, where each new asset bundle is generally titled to a different entity. For instance, the control server 20 utilizes a default deconstruction approach and default re-bundling approach to produce financial contributions of the down selected candidate assets when reconfigured (e.g., deconstructed and re-bundled in accordance with the default deconstruction approach and default re-bundling approach).

Having determined the financial contributions of each of the down selected candidate assets, the control server 20 selects assets from the down selected candidate assets to produce the augmenting asset bundle. The selecting includes choosing an asset selection approach to make the selections and completing the selecting utilizing the identified selection approach. The selection approaches include one or more of selecting assets that individually produce a highest level of ROI, selecting assets that produce a highest level of cash flow, selecting assets that produce a highest level of lift, selecting assets associated with highest levels of favorable financial contributions weighted by risk (e.g., asset risk, augmenting system risk, and transactional server entity risk), a random selection approach, and any other approach to optimize selection of the assets when considering utilization of deconstructed elements of the assets. The choosing of the asset selection approach may be based on one or more of a predetermination, a request, a correlation of historically utilized selection approaches and financial results, and a weighting factor that considers multiple desired outcomes.

Having chosen the asset selection approach, the control server 20 utilizes the asset selection approach to select assets from the down selected candidate assets based on the financial contributions to produce the augmenting asset bundle revealing characteristics of the selected assets (e.g., asset ID, asset type, etc.). For example, the control server 20 exchanges further control messages 36 with the one or more augmentation servers 24 to complete acquisition of the selected assets of the augmenting asset bundle based on the financial contributions of the selected assets.

The third primary function includes the communication system 10 facilitating the enhancement of the financial system utilizing the augmenting asset bundle such that the financial system substantially achieves the desired financial attributes. In an example of operation, the control server 20 selects a server to perform the reconfiguring of the acquired assets. The selection may be based on one or more of a predetermination, a request, and historical reconfiguring results. For example, the control server 20 selects the conversion server 16 to perform the reconfiguring of the acquired assets Having selected the conversion server 16 to perform the reconfiguring of the acquired assets, the control server 20 facilitates the reconfiguring of the assets of the augmenting asset bundle. The facilitating includes selecting the deconstruction approach, selecting the re-bundling approach, and initiating the reconfiguring utilizing the selected approaches. The selecting may be based on one or more of a predetermination, a request, information extracted from data messages 38 of one or more of the data sources 26 (e.g., current market conditions), and historical financial results based on various approaches. The initiating of the reconfiguring includes performing the reconfiguring by the control server 20 and/or issuing a control message 36 to the conversion server 16, where the control message 36 includes a request to perform the reconfiguring of the assets of the augmenting asset bundle in accordance with the selected deconstruction approach and the selected re-bundling approach. The control message 36 may further include the characteristics of the selected assets of the augmenting asset bundle. For example, the conversion server 16 deconstructs each asset of the augmenting asset bundle in accordance with the deconstruction approach to produce two or more deconstructed asset elements (e.g., of two or more element types) and re-bundles pluralities of the deconstructed asset elements in accordance with the re-bundling approach to produce the two or more asset bundles.

Having facilitated the reconfiguring of the assets, the control server 20 facilitates the reassignment of the reconfigured assets where the two or more asset bundles are to be titled to two or more entities of the communication system 10 to substantially satisfied the desired cash flow and desired valuation lift of the financial system. The facilitating includes issuing titling information to the conversion server 16 such that the conversion server 16 titles the two or more asset bundles in accordance with the titling information. Having received the titling information, the conversion server 16 produces two asset bundles and issues the titling information via a control message 36 to the legacy server 22 to associate a first asset bundle with the legacy system 12 and issues the titling information via another control message 36 to the transactional server 18 to associate a second asset bundle with the transactional server 18.

Having facilitated the titling of the two or more asset bundles, the control server 20 identifies the transactional server 18 to facilitate subsequent financial transactions utilizing the new asset bundles produced from the re-bundling of the deconstructed elements of the acquired assets. For example, the control server 20 issues a control message 36, via the network 28, to the transactional server 18, where the control message 36 includes subsequent financial transaction information (e.g., how to utilize the new asset bundles). For instance, the transactional server 18 exchanges control messages 36 with an augmentation server 24 associated with a particular asset to settle a periodic liability (e.g., the transactional server 18 facilitates a liability payment to the augmentation server 24 such as a life insurance premium payment) and to collect a cash flow (e.g., a life insurance policy death benefit payment). As another instance, the transactional server 18 partitions the cash flow from the augmentation server 24 into a first portion and a second portion, where the first portion is associated with the legacy server 22 (e.g., a portion of the life insurance policy death benefit payment flows to the pension system associated with the financial system of the legacy server 22) and the second portion is associated with the transactional server 18 (e.g., a holdback if any). Such financial transactions may include one or more of electronic money wire transfers and blockchain encoded secure funds transfer.

In various embodiments, a non-transitory computer readable storage medium includes at least one memory section that stores operational instructions that, when executed by one or more processing modules of one or more computing devices that each include a processor and a memory, causes each processing module to perform operations including the above-described asset reconfiguration and reassignment within the communication system.

Figure 2:
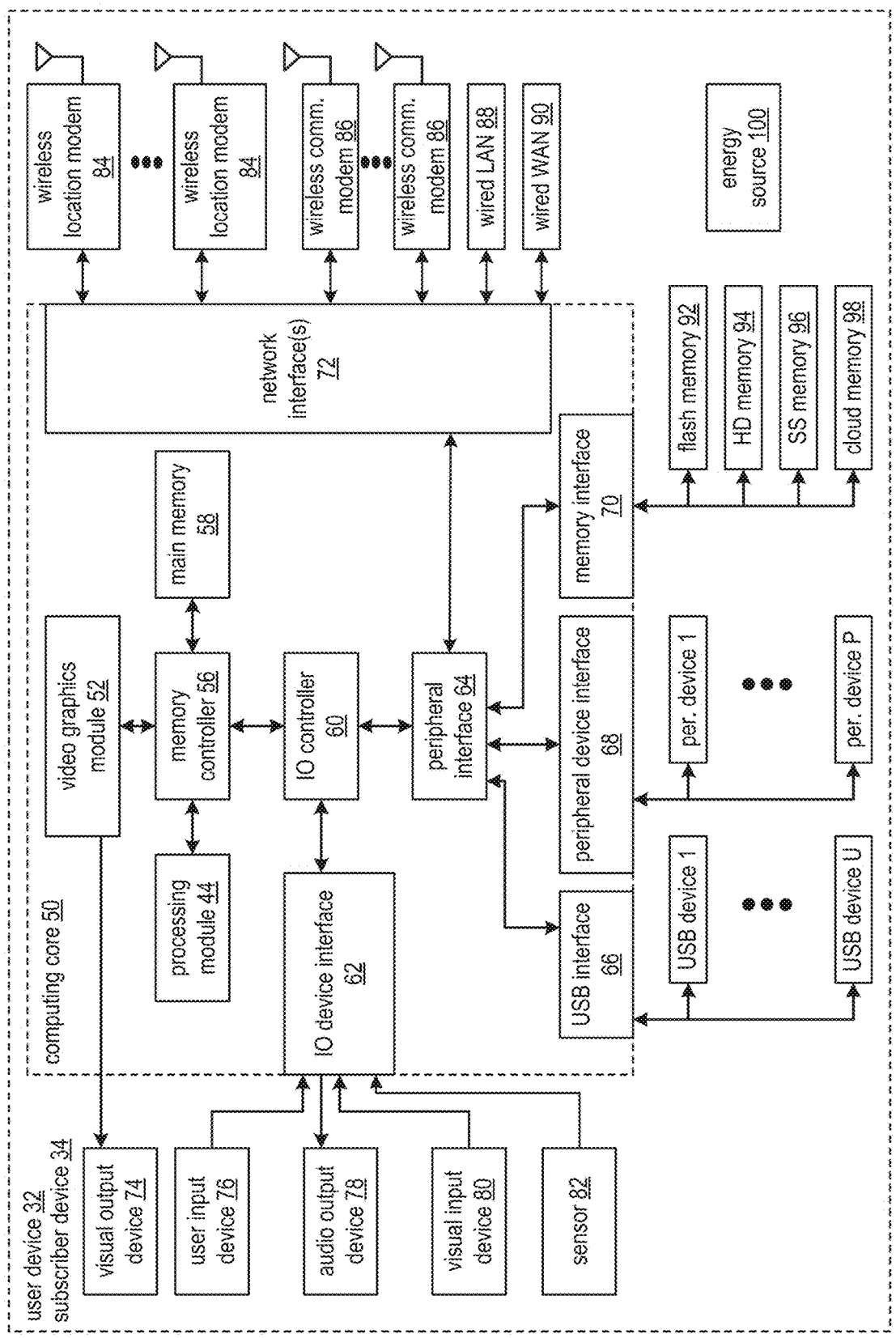
FIG. 2 is a schematic block diagram of an embodiment of a device of a communication system in accordance with the present invention.

FIG. 2 is a schematic block diagram of an embodiment of the user device 32 and the subscriber device 34 of the communication system 10 that includes a computing core 50, a visual output device 74 (e.g., a display screen, a light-emitting diode), a user input device 76 (e.g., keypad, keyboard, touchscreen, voice to text, etc.), an audio output device 78 (e.g., a speaker, a transducer, a motor), a visual input device 80 (e.g., a photocell, a camera), a sensor 82 (e.g., an accelerometer, a velocity detector, electronic compass, a motion detector, electronic gyroscope, a temperature device, a pressure device, an altitude device, a humidity detector, a moisture detector, an image recognition detector, a biometric reader, an infrared detector, a radar detector, an ultrasonic detector, a proximity detector, a magnetic field detector, a biological material detector, a radiation detector, a mass and/or weight detector, a density detector, a chemical detector, a gas detector, a smoke detector, a fluid flow volume detector, a DNA detector, a wind speed detector, a wind direction detector, a medical condition detector, a human activity detector, a motion recognition detector, and a battery level detector), one or more universal serial bus (USB) devices 1-U, one or more peripheral devices, one or more memory devices (e.g., a flash memory device 92, one or more hard drives 94, one or more solid state (SS) memory devices 96, and/or cloud memory 98), an energy source 100 (e.g., a battery, a generator, a solar cell, and a fuel cell), one or more wireless location modems 84 (e.g., a GPS receiver, a Wi-Fi transceiver, a Bluetooth transceiver, etc.), one or more wireless communication modems 86 (e.g., 4G, 5G cellular), a wired local area network (LAN) 88, and a wired wide area network (WAN) 90

The computing core 50 includes a video graphics module 52, one or more processing modules 44, a memory controller 56, one or more main memories 58 (e.g., RAM), one or more input/output (I/O) device interfaces 62, an input/output (I/O) controller 60, a peripheral interface 64, one or more USB interfaces 66, one or more network interface(s) 72, one or more memory interfaces 70, and/or one or more peripheral device interfaces 68. Each of the interfaces 62, 66, 68, 70, and 72 includes a combination of hardware (e.g., connectors, wiring, etc.) and operational instructions stored on memory (e.g., driver software) that is executed by the processing module 44 and/or a processing circuit within the interface. Each of the interfaces couples to one or more components of the user device 32. For example, one of the TO device interfaces 62 couples to an audio output device 78. As another example, one of the memory interfaces 70 couples to flash memory 92 and another one of the memory interfaces 70 couples to cloud memory 98 (e.g., an on-line storage system and/or on-line backup system).

The main memory 58 and the one or more memory devices include a computer readable storage medium that stores operational instructions that are executed by one or more processing modules 44 of one or more computing devices (e.g., the user device 32) causing the one or more computing devices to perform functions of the communication system 10. For example, the processing module 44 retrieves the stored operational instructions from the HD memory 94 for execution.

Figure 3:
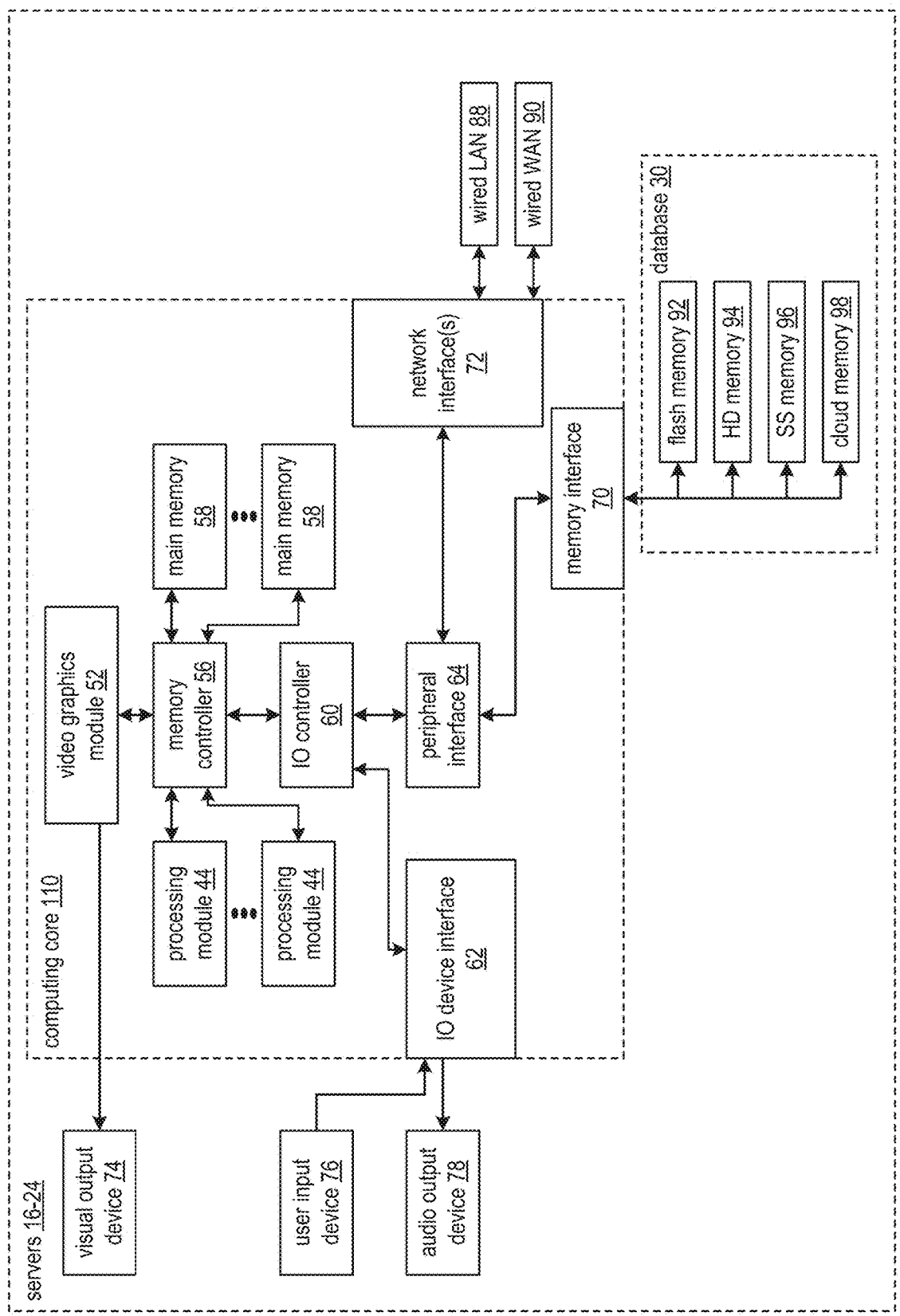
FIG. 3 is a schematic block diagram of an embodiment of a server of a communication system in accordance with the present invention.

FIG. 3 is a schematic block diagram of an embodiment of the servers 16-24 of the communication system 10 that includes a computing core 110 and elements of the user device 32 (e.g., FIG. 2), including one or more of the visual output device 74, the user input device 76, the audio output device 78, the memories 92-98 to provide the database 30 of FIG. 1, the wired LAN 88, and the wired WAN 90. The computing core 110 includes elements of the computing core 50 of FIG. 2, including the video graphics module 52, the plurality of processing modules 44, the memory controller 56, the plurality of main memories 58, the input-output controller 60, the input-output device interface 62, the peripheral interface 64, the memory interface 70, and the network interface(s) 72.

Figure 4A:
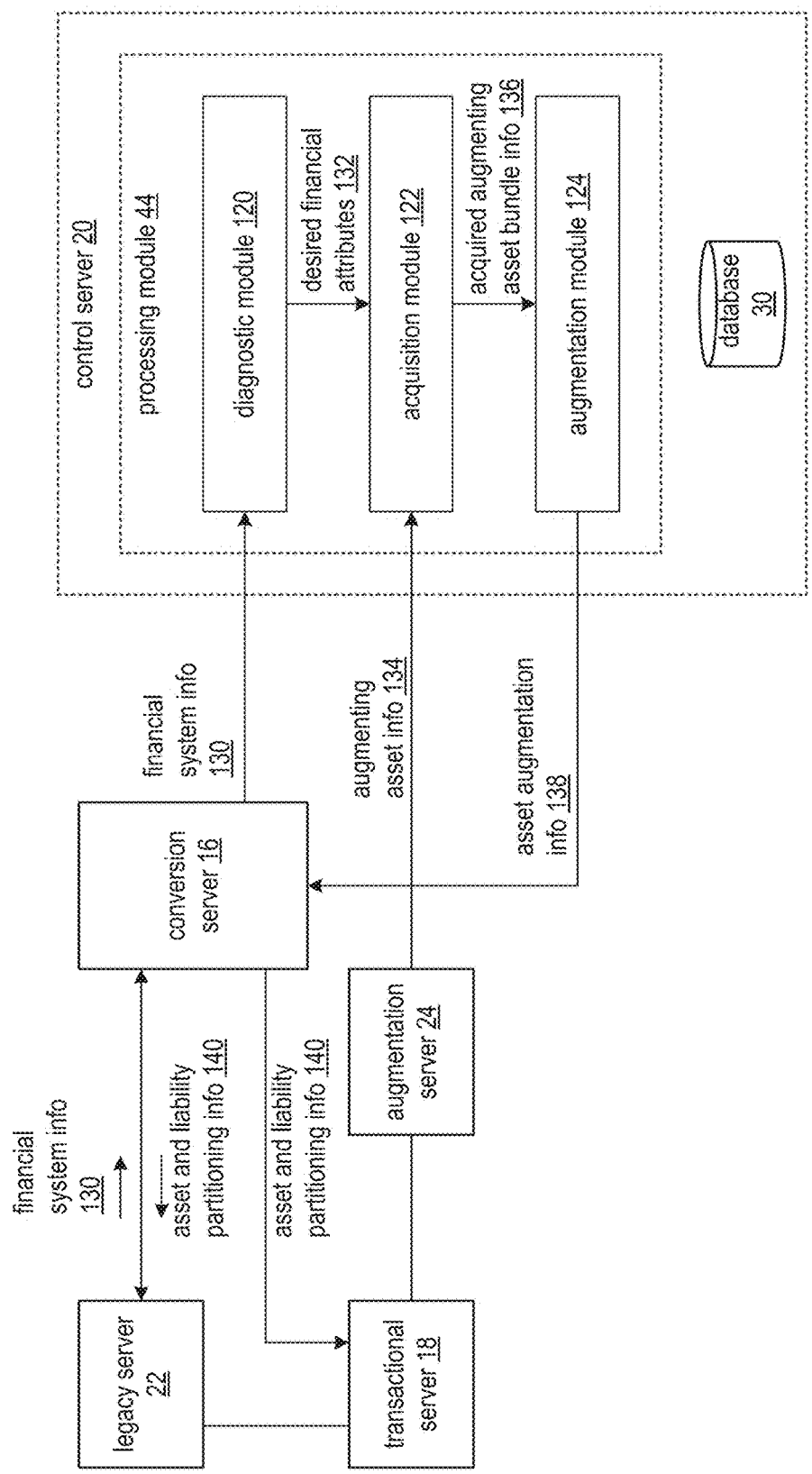
FIGS. 4A-4B are schematic block diagrams of another embodiment of a communication system in accordance with the present invention.
Figure 4B:
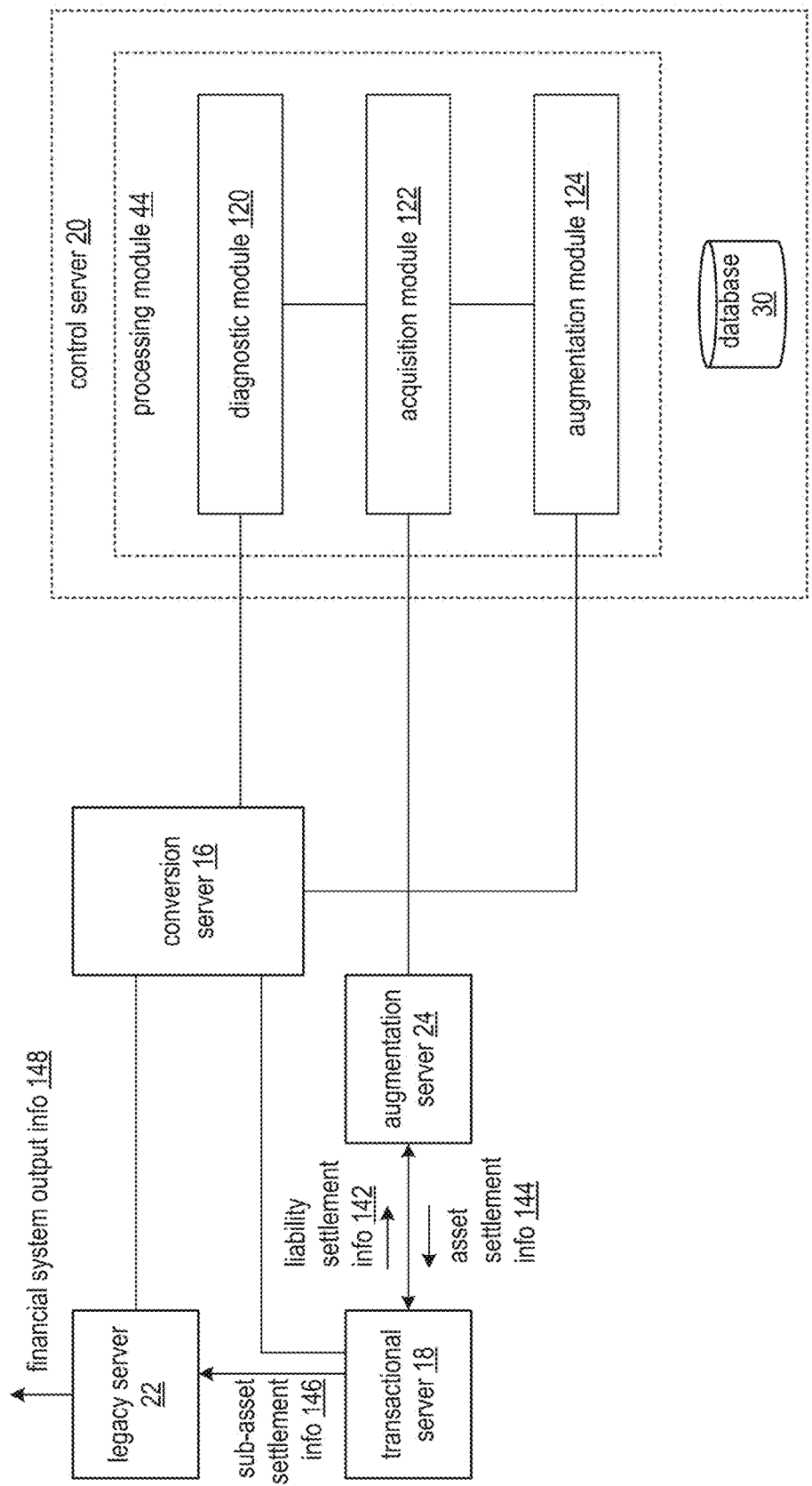

FIGS. 4A-B are schematic block diagrams of another embodiment of a communication system that includes the legacy server 22 of FIG. 1, the conversion servers 16 of FIG. 1, the transactional server 18 of FIG. 1, the augmentation server 24 of FIG. 1, and the control server 20 of FIG. 1. The control server 20 includes the processing module 44 of FIG. 1 and the database 30 of FIG. 1. The processing module 44 includes a diagnostic module 120, an acquisition module 122, and an augmentation module 124. Each of the diagnostic module 120, the acquisition module 122, and the augmentation module 124, may be implemented utilizing a processing module. This invention presents solutions where the communication system facilitates asset reconfiguration and reassignment.

FIG. 4A illustrates an example of the facilitating of the asset reconfiguration and reassignment where the legacy server 22 communicates financial system information 130 to the conversion servers 16. The financial system information 130 includes one or more of yield characteristics (e.g., ROI, timing of yields) of the legacy asset base of the financial system associated with the legacy server 22, a current valuation of the legacy asset base, a risk level associated with the legacy asset base, a liability schedule (e.g., a pension liability schedule when the financial system is a pension system), and demographics associated with users of the financial system (e.g., ages, lifestyles associated with pension participants).

Having received the financial system information 130, the conversion servers 16 forwards the financial system information 130 to the diagnostic module 120. The diagnostic module 120 determines desired financial attributes 132 of a legacy financial system, where the legacy financial system is supported by a legacy asset base, where the legacy asset base includes a plurality of legacy assets associated with a plurality of legacy asset types (e.g., stocks, bonds, etc.), and where the plurality of legacy assets is to provide favorable support for a plurality of ongoing financial obligations (e.g., monthly pension plan payments) in accordance with the desired financial attributes.

The diagnostic module 120 determines desired financial attributes 132 for the financial system supported by the legacy asset base by analyzing the financial system information 130 in accordance with historical financial system information and/or current market conditions. The desired financial attributes 132 includes one or more of a desired cash flow level associated with the ongoing financial obligations, a desired timing of the desired cash flow, a current valuation of the legacy asset base, a desired valuation of the legacy asset base, a desired valuation lift of the legacy asset base, a desired minimum rate of return for each legacy asset type associated with the plurality of legacy assets, and a maximum risk level (e.g., market risk, interest rates, etc.) for each legacy asset type associated with the plurality of legacy assets.

The determining the desired financial attributes 132 includes one or more of establishing the desired valuation lift of the legacy asset base in accordance with a difference between the desired valuation of the legacy asset base and the current valuation of the legacy asset base when the desired valuation of the legacy asset base is greater than the current valuation of the legacy asset base, identifying, for at least one unfavorably-performing legacy asset (e.g., achieving a lower rate of return than a minimally acceptable rate of return) of the plurality of legacy assets, an associated level of desired support for the plurality of ongoing financial obligations, analyzing a level of favorable support for the plurality of ongoing financial obligations to produce the desired financial attributes and interpreting an input (e.g., manager guidance) to produce the desired financial attributes. The operation of the diagnostic module 120 is discussed in greater detail with reference to FIGS. 5A-5B.

The acquisition module 122 facilitates acquisition of an augmenting asset bundle to enhance the legacy asset base such that the desired legacy asset value can be obtained while meeting the desired cash flow levels and timing. The facilitating includes the acquisition module 122 selecting, in accordance with the desired financial attributes 132, a subset of augmenting assets from a plurality of available augmenting assets to produce an augmenting asset bundle, where each available augmenting asset is associated with a future time-estimated benefit payment (e.g., a life settlement from an life insurance policy) and a series of time-certain obligated payments (e.g., a series of life insurance policy premium payments).

The selecting of the subset of augmenting assets from the plurality of available augmenting assets to produce the augmenting asset bundle includes determining, for each augmenting asset of the plurality of available augmenting assets, a valuation difference, where the valuation difference is a difference between a fair market value (e.g., for each asset, the future time-estimated benefit payment and the series of time-certain obligated payments discounted to future value at an equivalent interest rate and is typically associated with a value of the augmenting asset bundle in today's terms) and a net present value (e.g., for each asset, the future time-estimated benefit payment and the series of time-certain obligated payments discounted to future value at a discount rate that takes into account timing risks of the asset and is typically associated with an acquisition cost). The selecting of the subset of augmenting assets further includes ranking the plurality of available augmenting assets based on the valuation difference associated with each augmenting asset to produce a rank ordered list of available augmenting assets and selecting the subset of augmenting assets based on the rank ordered list of available augmenting assets, where financial aspects of the subset of augmenting assets compares favorably to the desired financial attributes.

The selecting of the subset of augmenting assets based on the rank ordered list further includes one or more of analyzing the rank ordered list to identify available augmenting assets associated with a greatest level of valuation difference (e.g., best spread), analyzing the rank ordered list to identify available augmenting assets associated with a maximum desired level of fair market value (e.g., highest value), analyzing the rank ordered list to identify available augmenting assets associated with a minimum desired level of net present value (e.g., lowest acquisition cost), selecting a number of available augmenting assets such that a sum of the fair market values of the selected available augmenting assets compares favorably to a desired valuation lift of the legacy asset base (e.g., raises the legacy asset base value), and selecting another number of available augmenting assets such that a sum of the net present values of the selected available augmenting assets compares favorably to a desired maximum aggregate net present value (e.g., lowest total acquisition cost).

Alternatively, or in addition to, the selecting the subset of augmenting assets from the plurality of available augmenting assets to produce the augmenting asset bundle further includes one or more of identifying the subset of augmenting assets associated with favorable support of a desired cash flow level for the ongoing financial obligations, identifying the subset of augmenting assets associated with a desired timing of the desired cash flow level for the ongoing financial obligations, identifying the subset of augmenting assets associated with a desired valuation of the legacy asset base, identifying the subset of augmenting assets associated with a desired minimum rate of return for the augmenting asset bundle, and identifying the subset of augmenting assets associated with a desired maximum risk level for the augmenting asset bundle.

As another example, the acquisition module 122 analyzes candidate asset characteristics of augmenting asset information 134 received from the augmentation server 24 to screen for candidate assets for acquisition, evaluates a financial contribution for each of the potentially acquired assets, selects a combination assets that when aggregated have a total financial contribution that compares favorably to the desired cash flow and desired valuation lift, and facilitates acquisition of the selected assets to produce acquired augmenting asset bundle information 136 (e.g., includes characteristics of the selected assets as well as identification). The operation of the acquisition module 122 is discussed in greater detail with reference to FIGS. 6A-6C.

The augmentation module 124 facilitates enhancement of the legacy asset base with the augmenting asset bundle to enable the financial system in accordance with the desired financial attributes (e.g., cash flow and valuation lift). The augmentation module 124 facilitates determining, in accordance with the desired financial attributes, a first portion of an aggregate of the future time-estimated benefit payments of the augmenting asset bundle for assignment to the legacy asset base. As an example of the determining the first portion of the aggregate of the future time-estimated benefit payments of the augmenting asset bundle, the augmentation module 124 selects a number of augmenting assets of the augmenting asset bundle such that a sum of fair market values of the selected augmenting assets compares favorably to a desired valuation lift of the legacy asset base. As another example, the augmentation module 124 selects the number of augmenting assets of the augmenting asset bundle such that such that a sum of fair market values of each remaining augmenting asset of remaining augmenting assets compares favorably to a sum of an aggregate of each of the series of time-certain obligated payments associated with the augmenting asset bundle.

As yet another example, the facilitation of the enhancement of the legacy asset base with the augmenting asset bundle includes the augmentation module 124 performing enhancement or the augmentation module 124 instructing another server (e.g., the conversion servers 16) to perform the enhancement. The enhancement includes selecting an asset deconstruction approach and utilizing the selected asset deconstruction approach, where each asset of the acquired augmenting asset bundle is deconstructed to produce at least two deconstructed elements and where individual elements are re-bundled into two or more groupings for titling to two or more entities of the communication system. For example, deconstructed elements are re-bundled into a first grouping that is to be titled to the legacy server 22 to replace the legacy asset base such that the new valuation and expected cash flow associated with the first grouping meets or exceeds the desired cash flow and desired valuation lift and other deconstructed elements are re-bundled into a second grouping that is to be titled to the transactional server 18. For instance, the augmentation module 124 outputs asset augmentation information 138 to the conversion server 16, where the asset augmentation information includes the selected asset deconstruction approach, and new asset titling information.

Having received the asset augmentation information 138, the conversion servers 16 issues asset and liability partitioning information 140 to the legacy server 22 and to the transactional server 18, where the asset and liability partitioning information 140 includes asset deconstruction results (e.g., characteristics of the deconstructed elements) and deconstructed asset element title information (e.g., which deconstructed elements are now affiliated with which entity). The operation of the augmentation module 124 is discussed in greater detail with reference to FIGS. 7A-7C.

FIG. 4B further illustrates the example of the facilitating of the asset reconfiguration and reassignment where the transactional server 18, detects availability of a first future time-estimated benefit payment of the first portion of the aggregate of the future time-estimated benefit payments and facilitates a payment transaction of the first future time-estimated benefit payment from an associated payer to the legacy asset base. For example, the transactional server 18 assigns a remaining portion of the aggregate of the future time-estimated benefit payments of the augmenting asset bundle to another entity and may further assign an aggregate of each of the series of time-certain obligated payments of the augmenting asset bundle to the other entity.

For instance, the transactional server 18, when receiving the asset and liability partitioning information 140, issues liability settlement information 142 to the augmentation server 24 when detecting that a liability is to be resolved (e.g., making a life insurance policy premium payment in accordance with a schedule), issues further liability settlement information 142 to the augmentation server 24 when detecting that an asset settlement is to be resolved (e.g., submitting a death benefit claim for a particular life insurance policy based on detecting death of the insured), and receiving asset settlement information 144 from the augmentation server 24 to complete settlement of a particular asset (e.g., receiving a payment transaction for a death benefit related to a life insurance policy).

Having received asset settlement information 144, the transactional server 18 partitions a payment associated with the received asset settlement information 144 into two or more payment partitions, where the partitioning is in accordance with the asset and liability partitioning information 140. For example, the transactional server 18 partitions the payment into X and Y portions, where the X portion is associated with the legacy server 22 in accordance with titling information of the asset and liability partitioning information 140, where the Y portion is associated with the transactional server 18 in accordance with the titling information of the asset and liability partitioning information 140, and where X+Y=100%.

Having partitioned the payment, the transactional server 18 issues sub-asset settlement information 146 to the legacy server, where the sub-asset settlement information 146 facilitates a payment transaction (e.g., bank wire, electronic transaction, E-cash, blockchain currency) for a portion of the payment (e.g., a portion of the payment transaction for the death benefit related to the life insurance policy to be assigned to the legacy server 22). Having received the sub-asset settlement information 146, the legacy server 22 issues financial system output information 148 to include a desired cash flow in accordance with the financial system funded by a plurality of such payment transactions as communicated by the sub-asset settlement information 146. For example, the legacy server 22 facilitates payment transactions to satisfy periodic payments to pension plan participants funded by the portion of the death benefit payments, when the financial system is a pension system and the acquired assets of the augmentation server 24 include life insurance policies that have been deconstructed and re-bundled.

Figure 4C:
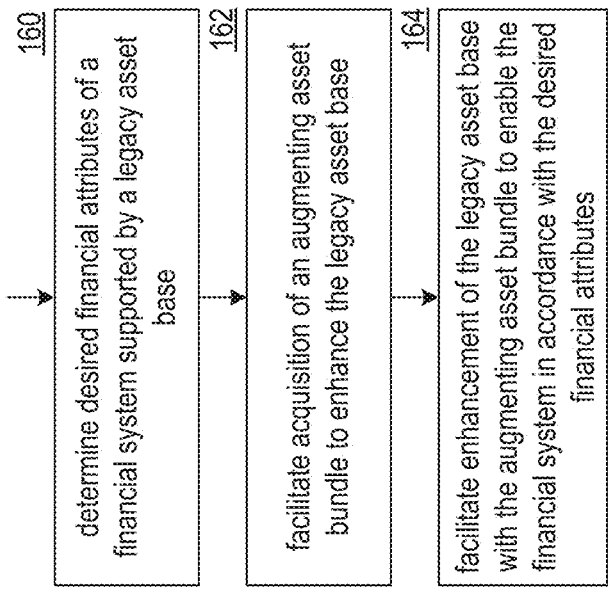
FIG. 4C is a logic diagram of an example of a method of enhancing a legacy asset base in accordance with the present invention.

FIG. 4C is a logic diagram of an example of a method of enhancing a legacy asset base that includes step 160 where a processing module (e.g., of a communication system) determines desired financial attributes of a financial system supported by a legacy asset base. For example, the processing module determines to evaluate the financial system (e.g., by request, in accordance with a schedule, when a metric of the financial system is detected to be unfavorable compared to a desired value), analyzes the financial system to produce a desired cash flow level (e.g., identifies a stream of liability payments), and analyzes the financial system to produce a desired valuation lift (e.g., identifies a gap between a current valuation of the legacy asset base and a desired valuation of the legacy asset base).

The method continues at step 162 where the processing module facilitates acquisition of an augmenting asset bundle to enhance the legacy asset base. For example, the processing module identifies augmenting asset preferences (e.g., receives, performs a lookup, interprets a query response), accesses augmenting asset information from an augmenting asset entity (e.g., an augmentation server) to extract candidate asset characteristics (e.g., searches through thousands of life insurance policy records), down selects candidate assets the compare favorably to the augmenting asset preferences (e.g., a favorable quality level), determines financial contributions of each of the down selected candidate assets (e.g., when split utilizing a deconstruction approach), selects an asset selection approach (e.g., to maximize one or more of cash flow contribution and balance sheet contribution), complete selection and acquisition from the down selected candidate assets to produce the augmenting asset bundle utilizing the selected asset selection approach where an estimated financial contribution of the augmenting asset bundle compares favorably to the desired cash flow and valuation left, and summarize the augmenting asset bundle to reveal selected asset characteristics.

The method continues at step 164 where the processing module facilitates enhancement of the legacy asset base with the augmenting asset bundle to enable the financial system in accordance with the desired financial attributes. For example, the processing module identifies a custodial entity and associated custodial server (e.g., a transactional server identified in a predetermination or contest), selects a deconstruction approach for the acquired augmenting asset bundle where an estimated value of deconstructed asset elements compares favorably to one or more of the desired cash flow, the desired valuation lift, and other funding requirements (e.g., value to be generated associated with the custodial server, generates title transfer information for the deconstructed asset elements, and facilitates the construction of the acquired augmenting asset bundle utilizing the deconstruction approach to produce the deconstructed asset elements (e.g., deconstruct or request that another entity such as the custodial server perform the deconstruction by issuing a request that includes selected asset title transfer information and the selected asset deconstruction approach).

The processing module may determine the estimated value of the deconstructed asset elements by calculating the fair market or present value of a first deconstructed element (e.g., a death benefit of a life insurance policy) of the deconstructed asset as a function of: the value of a corresponding second deconstructed element (e.g., a series of premium payments associated with the life insurance policy) of the deconstructed asset, a credit rating associated with the custodial entity (e.g., likelihood of the custodial entity continuing to make life insurance premium payments to a corresponding leverage is comedy), a credit rating associated with the augmenting asset entity (e.g., likelihood that life insurance company associated with the life insurance policy will make the death benefit payment), and a life expectancy of an insured entity (e.g., a person) associated with insurance policy. The calculation of the value may further be based on market conditions where a plurality of augmenting assets are deconstructed and re-bundled by others thus influencing a general market condition for valuations and spreads due to arbitrage as such deconstructed elements pass through multiple levels of ownership and retitling.

Figure 4D:
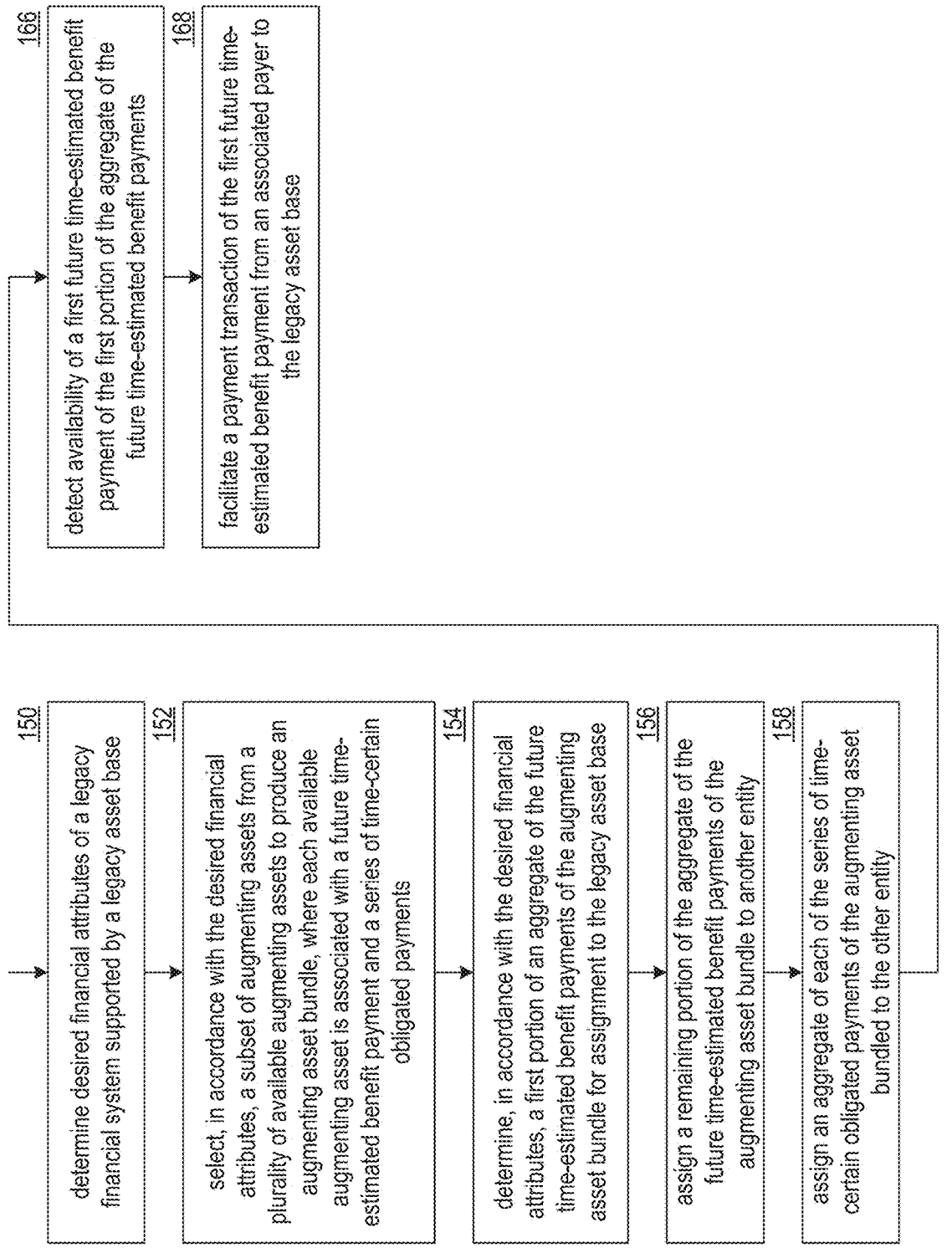
FIG. 4D is a logic diagram of another method of enhancing a legacy asset base in accordance with the present invention.

FIG. 4D is a logic diagram of another method of enhancing a legacy asset base within a computing system and/or communication system. In particular, a method is presented for use in conjunction with one or more functions and features described in conjunction with FIGS. 1-3, 4A, 4B, 4C, and also FIG. 4D. The method includes step 150 where a processing module of one or more processing modules of one or more computing devices of the computing system determines desired financial attributes of a legacy financial system, where the legacy financial system is supported by a legacy asset base, where the legacy asset base includes a plurality of legacy assets associated with a plurality of legacy asset types, and where the plurality of legacy assets is to provide favorable support for a plurality of ongoing financial obligations in accordance with the desired financial attributes.

The determining the desired financial attributes includes one or more of establishing a desired valuation lift of the legacy asset base in accordance with a difference between a desired valuation of the legacy asset base and a current valuation of the legacy asset base when the desired valuation of the legacy asset base is greater than the current valuation of the legacy asset base, identifying, for at least one unfavorably-performing legacy asset of the plurality of legacy assets, an associated level of desired support for the plurality of ongoing financial obligations, analyzing a level of favorable support for the plurality of ongoing financial obligations to produce the desired financial attributes and interpreting an input to produce the desired financial attributes.

The method continues at step 152 where the processing module selects, in accordance with the desired financial attributes, a subset of augmenting assets from a plurality of available augmenting assets to produce an augmenting asset bundle, where each available augmenting asset is associated with a future time-estimated benefit payment and a series of time-certain obligated payments. The selecting of the subset of augmenting assets may be accomplished by a variety of approaches.

A first approach of selecting of the subset of augmenting assets includes determining, for each augmenting asset of the plurality of available augmenting assets, a valuation difference, wherein the valuation difference is a difference between a fair market value and a net present value, ranking the plurality of available augmenting assets based on the valuation difference associated with each augmenting asset to produce a rank ordered list of available augmenting assets, and selecting the subset of augmenting assets based on the rank ordered list of available augmenting assets, where financial aspects of the subset of augmenting assets compares favorably to the desired financial attributes.

The selecting of the subset of augmenting assets based on the rank ordered list further includes one or more of analyzing the rank ordered list to identify available augmenting assets associated with a greatest level of valuation difference, analyzing the rank ordered list to identify available augmenting assets associated with a maximum desired level of fair market value, analyzing the rank ordered list to identify available augmenting assets associated with a minimum desired level of net present value, selecting a number of available augmenting assets such that a sum of the fair market values of the selected available augmenting assets compares favorably to a desired valuation lift of the legacy asset base, and selecting another number of available augmenting assets such that a sum of the net present values of the selected available augmenting assets compares favorably to a desired maximum aggregate net present value.

A second approach of selecting of the subset of augmenting assets includes one or more of identifying the subset of augmenting assets associated with favorable support of a desired cash flow level for the ongoing financial obligations, identifying the subset of augmenting assets associated with a desired timing of the desired cash flow level for the ongoing financial obligations, identifying the subset of augmenting assets associated with a desired valuation of the legacy asset base, identifying the subset of augmenting assets associated with a desired minimum rate of return for the augmenting asset bundle, and identifying the subset of augmenting assets associated with a desired maximum risk level for the augmenting asset bundle.

The method continues at step 154 where the processing module determines, in accordance with the desired financial attributes, a first portion of an aggregate of the future time-estimated benefit payments of the augmenting asset bundle for assignment to the legacy asset base. The determining the first portion of the aggregate of the future time-estimated benefit payments of the augmenting asset bundle includes one or more of selecting a number of augmenting assets of the augmenting asset bundle such that a sum of fair market values of the selected augmenting assets compares favorably to a desired valuation lift of the legacy asset base, and selecting the number of augmenting assets of the augmenting asset bundle such that such that a sum of fair market values of each remaining augmenting asset of remaining augmenting assets compares favorably to a sum of an aggregate of each of the series of time-certain obligated payments associated with the augmenting asset bundle.

The method continues at step 156 where the processing module assigns a remaining portion of the aggregate of the future time-estimated benefit payments of the augmenting asset bundle to another entity. For example, the processing module facilitates titling of the remaining portion to a pension plan sponsor associated with a pension plan that is affiliated with the legacy asset base. As another example, the processing module facilitates titling of the remaining portion to a financial custodian.

The method continues at step 158 where the processing module assigns an aggregate of each of the series of time-certain obligated payments of the augmenting asset bundle to the other entity. For example, the processing module establishes a commitment from the financial custodian to fund the aggregate of each of the series of time-certain obligated payments when the financial custodian receives the remaining portion of the aggregate of the future time-estimated benefit payments, where the benefit payments and the obligated payments are similar in values.

The method continues at step 166 for the processing module detects availability of a first future time-estimated benefit payment of the first portion of the aggregate of the future time-estimated benefit payments (e.g., a life settlement payment is available). The method continues at step 168 where the processing module facilitates a payment transaction of the first future time-estimated benefit payment from an associated payer to the legacy asset base. For example, the processing module issues a payment request to a financial server of the associated payer (e.g., a life insurance company) such that payment is made from the associated payer to the legacy asset base (e.g., to a pension plan).

The method described above in conjunction with the processing module can alternatively be performed by other modules of the communication system 10 of FIG. 1 or by other devices. In addition, at least one memory section (e.g., a computer readable memory, a non-transitory computer readable storage medium, a non-transitory computer readable memory organized into a first memory element, a second memory element, a third memory element, a fourth element section, a fifth memory element etc.) that stores operational instructions can, when executed by one or more processing modules of one or more computing devices (e.g., one or more servers, one or more user devices) of the communication system 10, cause the one or more computing devices to perform any or all of the method steps described above.

Figure 5A:
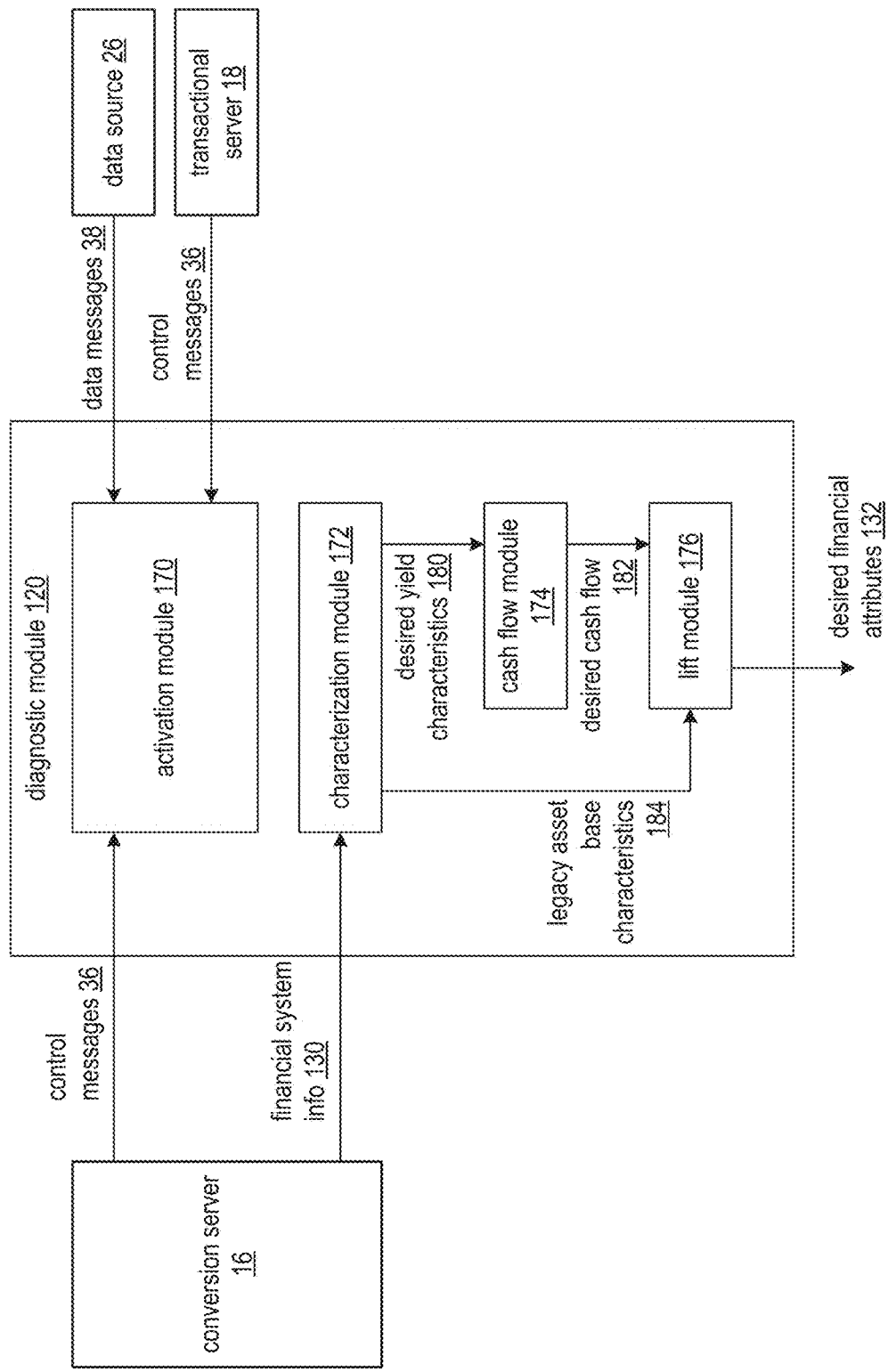
FIG. 5A is a schematic block diagram of an embodiment of a diagnostic module in accordance with the present invention.

FIG. 5A is a schematic block diagram of an embodiment of a diagnostic module that includes an activation module 170, a characterization module 172, a cash flow module 174, and a lift module 176, where the diagnostic module 120 communicates with one or more of the conversion server 16 of FIG. 1, the data source 26 of FIG. 1, and the transactional server 18 of FIG. 1. Each of the activation module 170, the characterization module 172, the cash flow module 174, and the lift module 176, may be implemented utilizing a processing module.

In an example of operation of the diagnostic module, the activation module 170 selects a financial system valuation trigger approach from a plurality of evaluation trigger approaches. The plurality of evaluation trigger approaches includes one or more of a legacy asset base value below a low threshold level, a desired cash flow level above a high threshold level, a desired valuation lift above a high threshold level, and evaluation time frame has expired, receiving a request, and detecting that an external factor level is beyond a normal threshold level. The selecting includes one or more of utilizing a predetermination, interpreting a request, and interpreting a received alert from the server or data source (e.g., receive a control message 36 and/or data message 38 from one or more of the conversion server 16, the data source 26, and the transactional server 18).

Having selected the evaluation trigger approach, the activation module 170 indicates to evaluate a financial system associated with the conversion server 16 when detecting a trigger threshold event in accordance with the evaluation trigger approach (e.g., where the conversion server 16 is affiliated with a sponsor that is associated with the financial system of a legacy server).

When evaluating the financial system, the characterization module 172 identifies financial system desired yield characteristics 180. The financial system desired yield characteristics includes one or more of an ROI level, a dividend level or similar payout level, and payout timing, (e.g., for payouts for a pension liability schedule, pension participant demographics, pension participant mortality information, pension participant lifestyle information). The identifying includes one or more of receiving, performing a lookup, interpreting a query response, interpreting financial system information 130 received from the conversion server, and generating an estimate based on a last stored financial system information.

The characterization module 172 determines legacy asset base characteristics 184 based on the financial system information 130. The legacy asset base characteristics include one or more of, for each asset type, a face amount, a fair market value, a net present value, associated timing, and a risk level. The determining includes one or more of interpreting a query response, performing a lookup, interpreting a data message 38 from the data source 26, and interpreting the financial system information 130 from the conversion server 16.

Having generated the desired yield characteristics 180 and the legacy asset base characteristics 184, the characterization module 172 sends the desired yield characteristics 180 to the cash flow module 174 and sends the legacy asset base characteristics 184 to the lift module 176. The cash flow module 174 determines a desired cash flow 182 based on the financial system desired yield characteristics 180 (e.g., cash flow to substantially match desired pension payouts when the financial system is a pension system). The lift module 176 determines a value of the legacy asset base based on the legacy asset base characteristics 184. The determining includes one or more of calculating utilizing at least one of fair market value approach, a net present value approach, and interpreting a query response (e.g., issue a value request to the transactional server 18, where the transactional server 18 utilizes market values to generate an estimate). The lift module determines a value of the desired cash flow based on the desired cash flow 182. The determining includes one or more of calculating utilizing at least one of a fire market value approach, a net present value approach, and interpreting a query response (e.g., issue a value request to the conversion server 16 and receive the query response). The lift module calculates a difference between the value of the desired cash flow and the value of the legacy asset base to produce a desired valuation lift. The lift module outputs desired financial attributes 132 to include the value of the desired cash flow and the desired valuation lift.

Figure 5B:
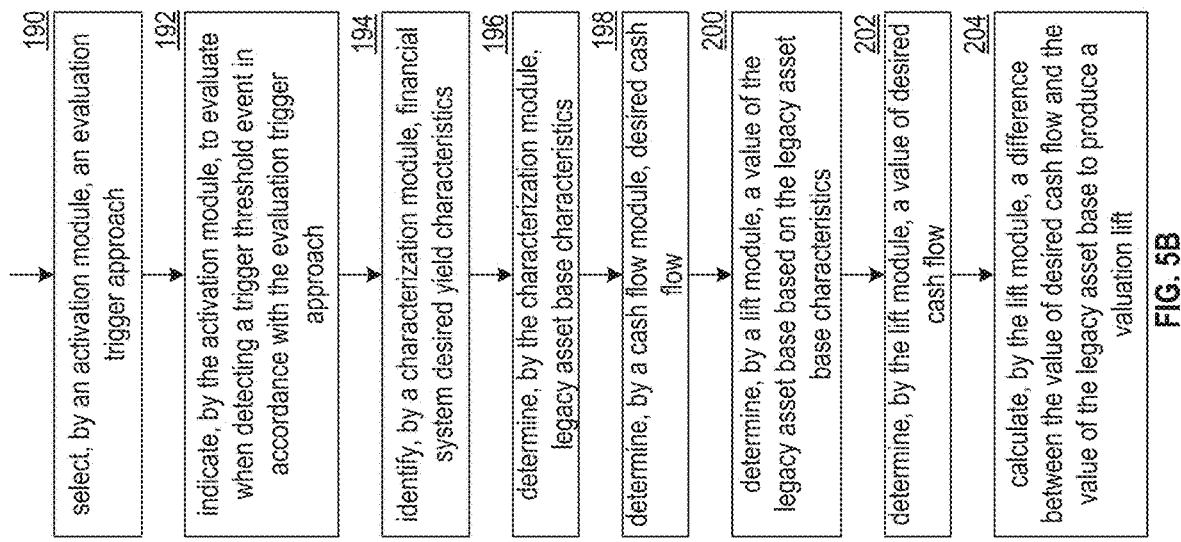
FIG. 5B is a logic diagram of an example of a method of diagnosing a legacy asset base in accordance with the present invention.

FIG. 5B is a logic diagram of an example of a method of diagnosing a legacy asset base which includes step 190 where an activation module selects an evaluation trigger approach. The selecting may be based on one or more of utilizing a predetermination, interpreting a request, and receiving an alert. The method continues at step 192 where the activation module indicates to evaluate when detecting a trigger threshold event in accordance with the evaluation trigger approach. For example, the activation module detects a favorable comparison of an input to a corresponding condition of the evaluation trigger approach and indicates to evaluate.

The method continues at step 194 where a characterization module identifies financial system desired yield characteristics. The identifying includes one or more of interpreting a query response, performing a lookup, and receiving financial system information that includes the financial system desired yield characteristics. The method continues at step 196 where the characterization module determines legacy asset base characteristics. The determining includes one or more of interpreting a message in response to a query, performing a lookup, and interpreting a data message from a data source.

The method continues at step 198 where a cash flow module determines desired cash flow. The determining may be based on calculating the desired cash flow based on the desired yield characteristics. The method continues at step 200 where a lift module determines a value of the legacy asset base based on the legacy asset base characteristics. The determining includes utilizing at least one of fair market value approach, a net present value approach, and interpreting market and/or historical conditions. The method continues at step 202 where the lift module determines a value of desired cash flow. The determining includes utilizing at least one of the fair market value approach, the net present value approach, and interpreting market and/or historical conditions. The method continues at step 204 where the lift module calculates a difference (e.g. subtract) between the value of desired cash flow and the value of the legacy asset base to produce a valuation lift.

The method described above in conjunction with the processing module can alternatively be performed by other modules of the communication system 10 of FIG. 1 or by other devices. In addition, at least one memory section (e.g., a computer readable memory, a non-transitory computer readable storage medium, a non-transitory computer readable memory organized into a first memory element, a second memory element, a third memory element, a fourth element section, a fifth memory element etc.) that stores operational instructions can, when executed by one or more processing modules of one or more computing devices (e.g., one or more servers, one or more user devices) of the communication system 10, cause the one or more computing devices to perform any or all of the method steps described above.

Figure 6A:
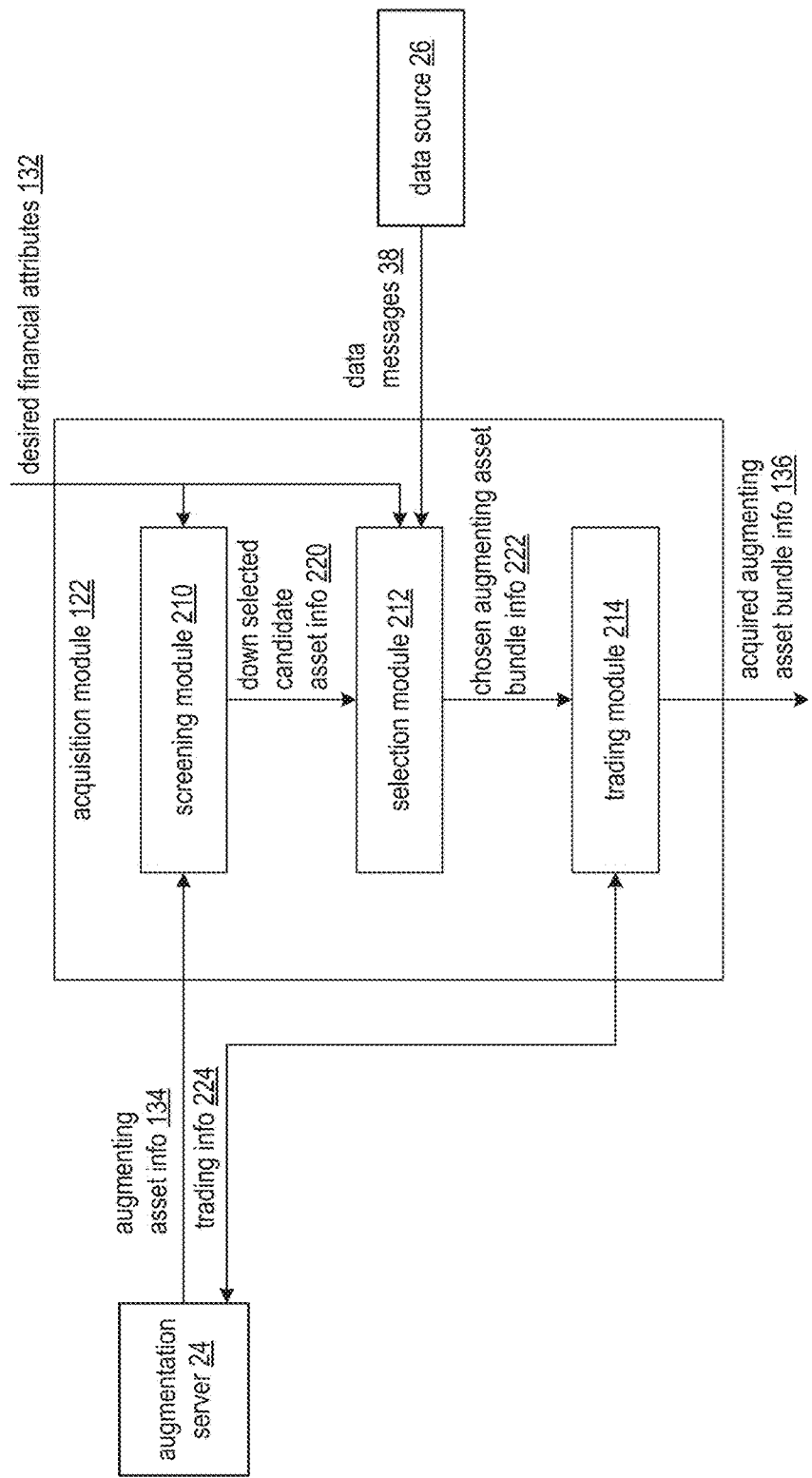
FIG. 6A is a schematic block diagram of an embodiment of an acquisition module in accordance with the present invention.

FIG. 6A is a schematic block diagram of an embodiment of an acquisition module that includes a screening module 210, a selection module 212, and a trading module 214, where the acquisition module 122 communicates with one or more of the augmentation server 24 of FIG. 1, and the data source 26 of FIG. 1. Each of the screening module 210, the selection module 212, and the trading module 214, may be implemented utilizing a processing module.

In an example of operation of the acquisition module 122, a screening module 210 identifies augmenting asset preferences by interpreting augmenting asset information 134 from the augmentation server 24 and the desired financial attributes 132. The augmenting asset preferences includes one or more of a risk level of an entity associated with the augmentation server, a credit rating of the entity, the validity of available assets (e.g., insurable interest, title chain), and an estimated asset ROI.

Having identified the augmenting asset preferences, the screen module 210 identifies candidate assets that are associated with attributes that compare favorably to the augmenting asset preferences to produce down selected candidate asset information 220. For example, the selection module 212 interprets the augmenting asset information 134 to identify characteristics of the candidate assets, compares the characteristics to the asset preferences, and indicates the down selection (e.g., identifiers of selected assets) when the attributes of the candidate asset compares favorably to the asset preferences.

The selection module 212 estimates a financial contribution of each of the down selected candidate assets, where the estimation is based on valuation after the asset has been deconstructed. The estimating may be based on one or more of purchase price from the augmentation server 24, fair market valuation (e.g., based on a data message 38 from the data source 26 with regards to market pricing), asset and liability components of the asset, and matching to the desired financial attributes over a time frame of cash flow (e.g., of death benefit payments when the asset is a life insurance policy).

Having produced the estimated financial contributions, the selection module 212 chooses an asset selection approach. The asset selection approaches include 1) a passive approach where an estimated value after deconstructing each asset into a positive asset and a liability, where the positive asset is associated with the financial system of the legacy asset based, 2) an active approach where the desired financial attributes are matched to the estimated value after deconstructing each asset to produce positive assets associated with the financial system, and 3) an iterative approach where each asset is selected one by one to optimize resulting assets of the financial system in accordance with the desired financial attributes. The choosing may include one or more of utilizing a predetermination, interpreting a request, and interpreting historical selection data with regards to selection approach and financial results.

Having chosen the asset selection approach, the selection module 212 completes the selection from the down selected candidate assets to produce chosen augmenting asset bundle information 222 (e.g., identified assets), where the selection is made in accordance with the chosen asset selection approach, and where estimated financial contributions of the augmenting asset bundle compares favorably to the desired cash flow and desired valuation lift of the desired financial attributes 132. The trading module facilitates acquisition (e.g., purchase) of the assets of the augmenting asset bundle to produce acquired augmenting asset bundle information 136 that includes selected asset characteristics. The selected asset characteristics include one or more of identification of each asset, title information, expected financial contribution, risk levels, identity of the entity associated with the augmentation server of the ad set, and the suggested deconstruction approach. The facilitating includes exchanging trading information 224 with the augmentation server 24 to confirm purchase pricing, pass-through of funding in accordance with the purchase pricing, and confirming receipt and title of the purchased assets. Such a financial transaction may be carried out by utilizing one or more electronic financial transaction approaches including electronic cash, wire transfer, electronic funds transfer, and a blockchain approach.

Figure 6B:
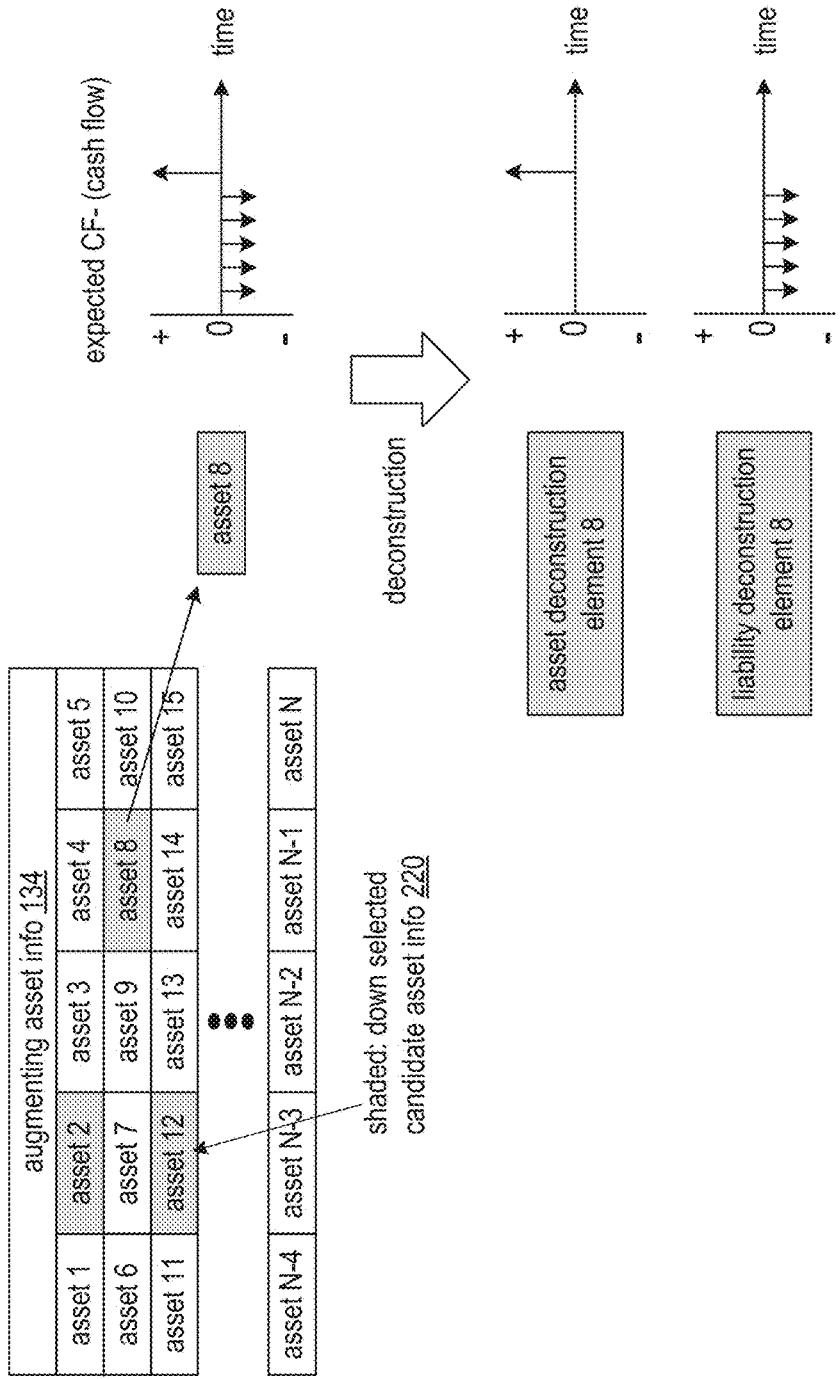
FIG. 6B is a diagram of an example of acquiring augmenting assets in accordance with the present invention.

FIG. 6B is a diagram of an example of acquiring augmenting assets where values of a plurality of assets are considered based on their characteristics and an asset deconstruction approach. The plurality of assets are associated with augmenting asset information 134. For example, a plurality of N augmenting assets, that are available for purchase (e.g., from an insurance company, from a hedge fund entity, from any other entity), each are associated with augmenting asset information. For example, an asset 8 represents a life insurance policy that is associated with a series of premium payments to maintain the life insurance policy and a one-time death benefit payment upon death of a person associated with a life insurance policy. A risk level associated with fulfilling continued payment of the premium payments may be higher when responsibility for making the premium payments is associated with the person associated with a life insurance policy as compared to when the responsibility for making the premium payments associated with a financial market entity known for making commitments (e.g., in this case committing to make the premium payments). A risk level associated with receiving the one-time death benefit payment may be higher when the associated life insurance company has an unfavorable death benefit payment history as compared to other life insurance companies or when the risk level of making the premium payments is higher than average.

The valuation of the asset based on the deconstruction approach involves deconstructing each asset into two or more deconstructed elements which may henceforth be alternatively referred to as deconstructives. For example, the asset 8 is deconstructed into an asset deconstruction element 8 and a liability deconstruction element 8, where the asset deconstruction element 8 is associated with the death benefit payment in the life insurance policy example and the liability deconstruction element 8 is associated with the plurality of premium payments. The selection of candidate assets to produce down selected candidate asset information 220 includes identifying assets associated with asset deconstruction elements with favorable payouts and payout timing within a desired risk level (e.g., relative to other assets, relative to minimum levels as compared to historical asset element information), and liability deconstruction elements associated with favorable premium payments and premium payment timing when under custodial care of an entity with a favorable risk level (e.g., relative to other liabilities, relative to historical liability element information).

Figure 6C:
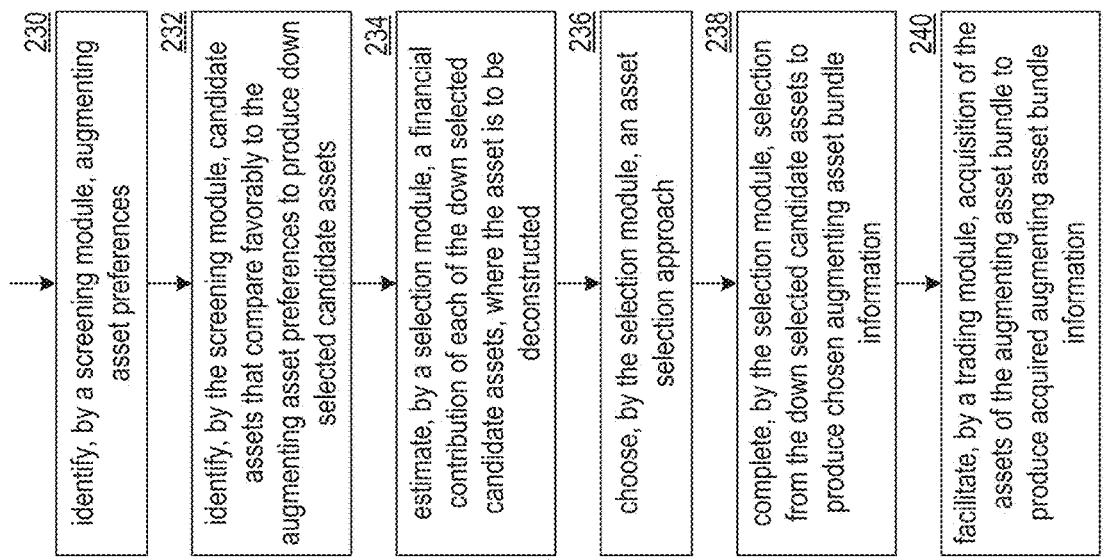
FIG. 6C is a logic diagram of an example of a method acquiring augmenting assets in accordance with the present invention.

FIG. 6C is a logic diagram of an example of a method acquiring augmenting assets that includes step 230 where a screening module identifies augmenting asset preferences. For example, the screening module interprets augmenting asset information and desired financial attributes to produce the augmenting asset preferences. The method continues at step 232 where the screening module identifies candidate assets that compare favorably to the augmenting asset preferences to produce down selected candidate assets. For example, the screen module interprets the augmenting asset information to identify characteristics of the candidate assets, compares the candidate assets to the asset preferences, and indicates down selection when the candidate asset compares favorably to the asset preferences.

The method continues at step 234 where a selection module estimates a financial contribution of each of the down selected candidate assets, where the asset is to be deconstructed. For example, the selection module analyzes deconstruction of the candidate asset into an inter-related asset and a liability, further based on one or more of price, fair market value, and matching to the desired financial attributes were a varying range of timing of benefits of the asset when the asset produces benefits (e.g., a death benefit payment of a life insurance policy). The method continues at step 236 where the selection module chooses an asset selection process. The choosing may be based on one or more of a predetermination, interpreting a request, and interpreting historical selection data and associated financial results.

The method continues at step 238 where the selection module completes selection from the down selected candidate assets to produce chosen augmenting asset bundle information, where the selection is made in accordance with the chosen asset selection approach, and where estimated financial contributions of the augmenting asset bundle compares favorably to a desired cash flow and a desired valuation lift of the desired financial attributes. The method continues at step 240 where a trading module facilitates acquisition of the assets of the augmenting asset bundle to produce acquired augmenting asset bundle information. For example, the trading module exchanges trading information with an augmentation server to confirm purchase pricing, passes through a funding transaction in accordance with the purchase pricing to purchase the assets, and confirms receipt and title of the purchase of the assets of the acquired augmenting asset bundle.

The method described above in conjunction with the processing module can alternatively be performed by other modules of the communication system 10 of FIG. 1 or by other devices. In addition, at least one memory section (e.g., a computer readable memory, a non-transitory computer readable storage medium, a non-transitory computer readable memory organized into a first memory element, a second memory element, a third memory element, a fourth element section, a fifth memory element etc.) that stores operational instructions can, when executed by one or more processing modules of one or more computing devices (e.g., one or more servers, one or more user devices) of the communication system 10, cause the one or more computing devices to perform any or all of the method steps described above.

Figure 7A:
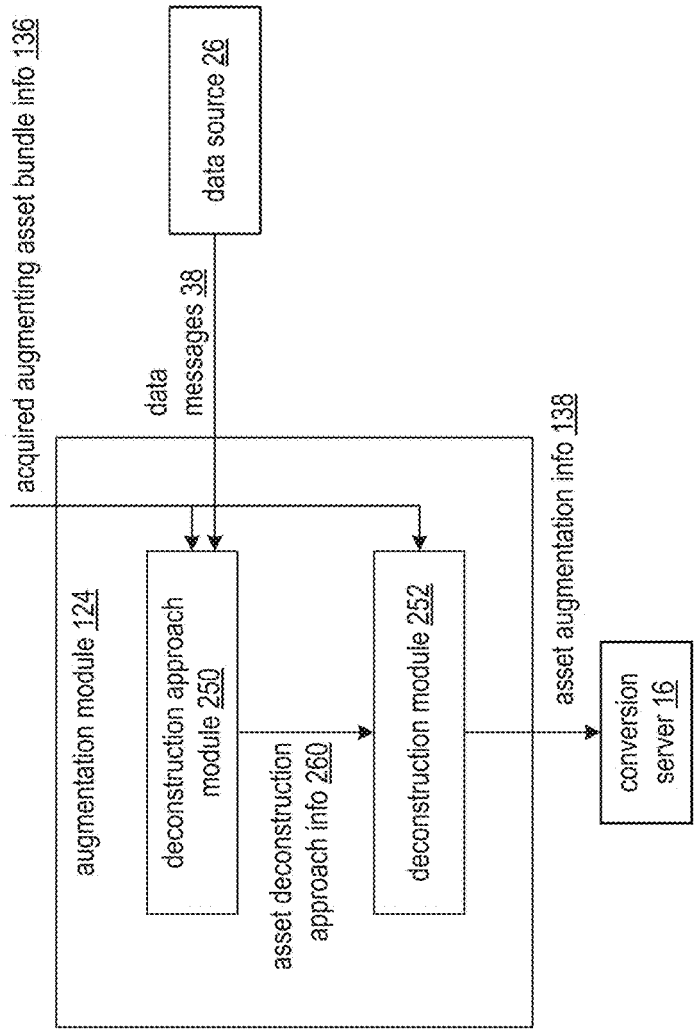
FIG. 7A is a schematic block diagram of an embodiment of an augmentation module in accordance with the present invention.

FIG. 7A is a schematic block diagram of an embodiment of an augmentation module 124 that includes a deconstruction approach module 250 and a deconstruction module 252, where the augmentation module 124 communicates with the data source 26 of FIG. 1 and the conversion server 16 of FIG. 1. Each of the deconstruction approach module 250 and the deconstruction module 252 may be implemented utilizing a processing module.

In an example of operation of the augmentation module 124, the deconstruction approach module 250 identifies a transactional server associated with a custodial entity to facilitate ongoing transactions of a financial system when augmented by an acquired augmenting asset bundle. The identifying includes one or more of interpreting a request, interpreting a query response, declaring a competition winner (e.g., a bid), analyzing historical transaction information, identifying a desired risk level for an entity associated with a transactional server, and interpreting risk information associated with entities of transactional servers.

Having identified the transactional server, the deconstruction approach module 250 selects a deconstruction approach for the acquired augmenting asset bundle based on acquired augmenting asset bundle information 136 to produce asset deconstruction approach information 260, where an estimated value of deconstructed asset elements compares favorably to one or more of a desired cash flow and a desired valuation lift and other funding requirements (e.g., value to be generated associated with the transactional server). The deconstruction approaches include a first approach where each asset is converted into a first deconstructed asset element that is an asset and a second peak constructed asset element that is a liability, a number of first elements are titled with an entity associated with a legacy server and a remaining number of first elements with another entity associated with the identified transactional server, substantially all of the second elements are titled to the entity associated with the identified transactional server, where the quantities of tight of the elements is in accordance with one or more of a net present value, exchange or market value historical pricing, instructed pricing, risk levels of each of the entities, and arbitrage information of a data message 38 received from the data source 26.

The deconstruction approaches includes a second approach where in combination with the first approach, a portion of the elements are titled to an entity associated with the conversion server. The selecting may be based on one or more of a predetermination, interpreting a request, interpreting historical results associated with particular deconstruction approaches, interpreting data messages 38 from the data source 26 associated with current market conditions, and optimizing a level of fit for cash flow and for value for at least a portion of the assets for two or more of the deconstruction approaches to identify a presently superior deconstruction approach, where asset element valuation depends on risk associated with entities affiliated with one or more of the legacy server, the transactional server and augmentation server, the conversion server 16. The selecting further includes outputting the asset deconstruction approach information to include one or more of the approach for each asset, a number of assets, identifiers of the assets, and preliminary asset titling information (e.g., which deconstructed asset is assigned to which entity).

Having selected the deconstruction approach for each asset, the deconstruction module 252 facilitates deconstruction of substantially each asset of the acquired augmenting asset bundle utilizing the selected deconstruction approach to produce asset augmentation information 138 (e.g., selected asset title transfer information, selected asset deconstruction approaches). The facilitating includes performing the deconstruction or requesting that the conversion server 16 execute the deconstruction (e.g., in accordance with an agreement).

Figure 7B:
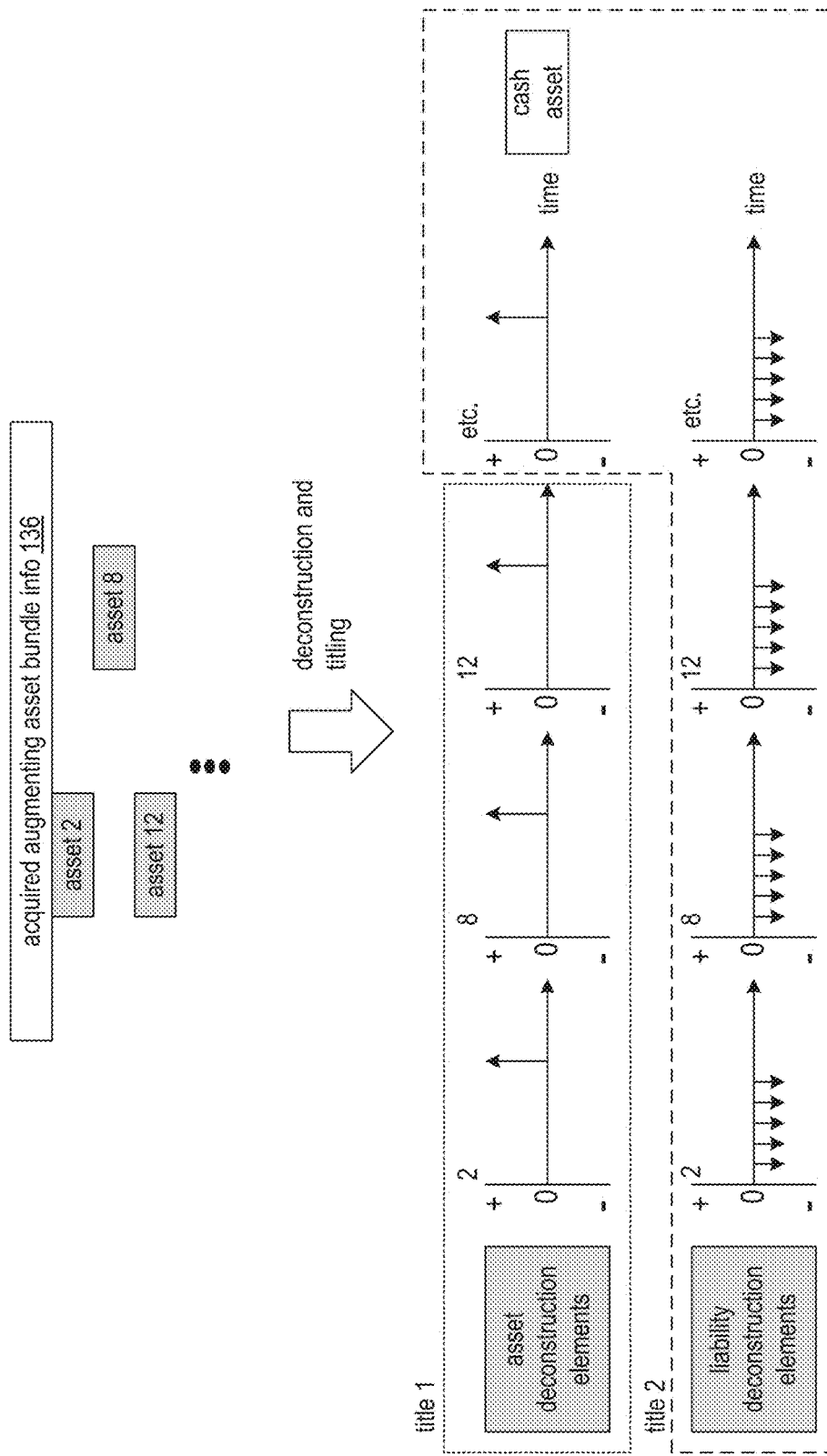
FIG. 7B is a diagram of an example of utilizing augmenting assets in accordance with the present invention.

FIG. 7B is a diagram of an example of utilizing augmenting assets where assets described by acquired augmenting asset bundle information 136 are deconstructed entitled to produce two or more groupings of deconstructed elements from the assets of an acquired augmenting asset bundle. For example, assets 2, 8, and 12 are deconstructed in accordance with a deconstruction approach to produce asset deconstruction elements and liability deconstruction elements, when the assets 2, 8, and 12 are part of the acquired augmenting asset bundle.

Having deconstructed each element, individual elements are partitioned into two or more groupings, where each grouping is title to a different entity of two or more entities, and where a valuation of each grouping meets valuation requirements for the groupings and as a whole for the financial system of a legacy asset base for augmentation. For example, the value of a title 1 grouping may be driven by the asset deconstruction elements of the assets 2, 8, and 12 while the value of a title 2 grouping may be driven by the liability deconstruction elements of assets 2, 8, 12, and others, along with a cash asset and one or more asset deconstruction elements from other assets of the acquired augmenting asset bundle. Alternatively, the title 1 grouping may include another cash asset, or any other asset including bonds etc., and/or one or more liability deconstructed elements. Further alternatively, the title 2 grouping may include shortened liability deconstructed elements, where the shortened liability deconstructed element includes a subset of a plurality of liability (e.g., payment) cash flows (e.g., 2 of n life insurance policy premium payments, a maximum of 10 years of life insurance premium payments, 75% of each remaining life insurance policy premium payment, etc.).

To predict valuations, the value of the title 1 grouping is a function of the aggregated value of each asset deconstruction element, where each asset deconstruction element has a value that's a function of a corresponding liability deconstruction element value (e.g., level of premium payments of the life insurance policy as the original asset), a credit rating associated with a custodial entity (e.g., an entity associated with a transactional server) responsible for making the series of payments of the liability deconstruction element, a credit rating of an entity issuing the original asset (e.g., the life insurance company responsible for the life insurance policy), and timing associated with future cash flow of the asset deconstruction element (e.g., timing of a death benefit payment from the life insurance policy upon death of an insured person).

The value of the title 2 grouping is a function of the expected liability payments associated with the liability deconstruction elements (e.g., life insurance policy premiums based on those insured and mortality table information), one or more asset deconstruction elements (e.g., death benefits), and a cash level or similar (e.g., any other financial instrument to add value such that a net value of the title 2 grouping is positive with respect to the life of the title 2 grouping). As an example, the cash asset may be produced by selling at least some of the asset deconstruction elements to produce cash to bundle into the title 2 grouping.

Figure 7C:
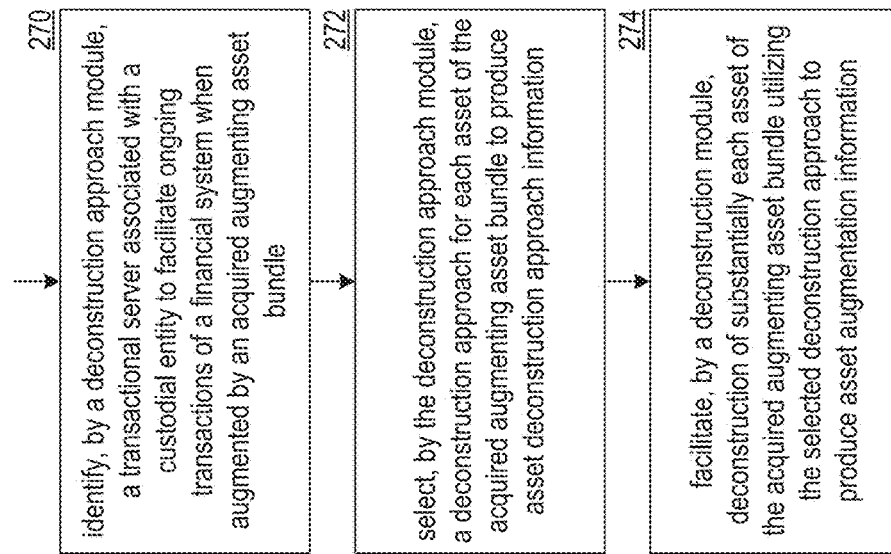
FIG. 7C is a logic diagram of an example of a method utilizing augmenting assets in accordance with the present invention.

FIG. 7C is a logic diagram of an example of a method utilizing augmenting assets that includes step 270 where a deconstruction approach module identifies a transactional server associated with a custodial entity to facilitate ongoing transactions of the financial system when augmented by an acquired augmenting asset bundle. The identifying includes one or more of interpreting a request, interpreting a query response, declaring a competition winner, analyzing historical transaction information, identifying a desired risk level for an entity associated with a transactional server, and interpreting risk information associated with entities of a plurality of transactional servers.

The method continues at step 272 where the deconstruction approach module selects a deconstruction approach for each asset of the acquired augmenting asset bundle to produce asset deconstruction approach information, where an estimated value of deconstructed asset elements compares favorably to one or more of a desired cash flow and a desired valuation lift and other funding requirements of a financial system for augmentation. The selecting includes one or more of utilizing a predetermination, interpreting a request, interpreting historical results for various deconstruction approaches, analyzing data messages from a data source where the data messages include current market conditions, optimizing a level of fit for cash flow and for value for at least a portion of the assets for two or more of the deconstruction approaches to identify a presently superior deconstruction approach, where asset element valuation depends on risks associated with entities associated with one or more of a plurality of servers of a communication system, and outputting the asset deconstruction approach information to include one or more of an approach for each asset, a number of assets, identifiers of assets, and preliminary asset title transfer information.

The method continues at step 274 where a deconstruction module facilitates deconstruction of substantially each element of the acquired augmenting asset bundle utilizing the selected deconstruction approach to produce asset augmentation information. The facilitating includes performing the deconstruction or requesting that a remote server performs the deconstruction utilizing the asset deconstruction approach information.

Figure 8A:
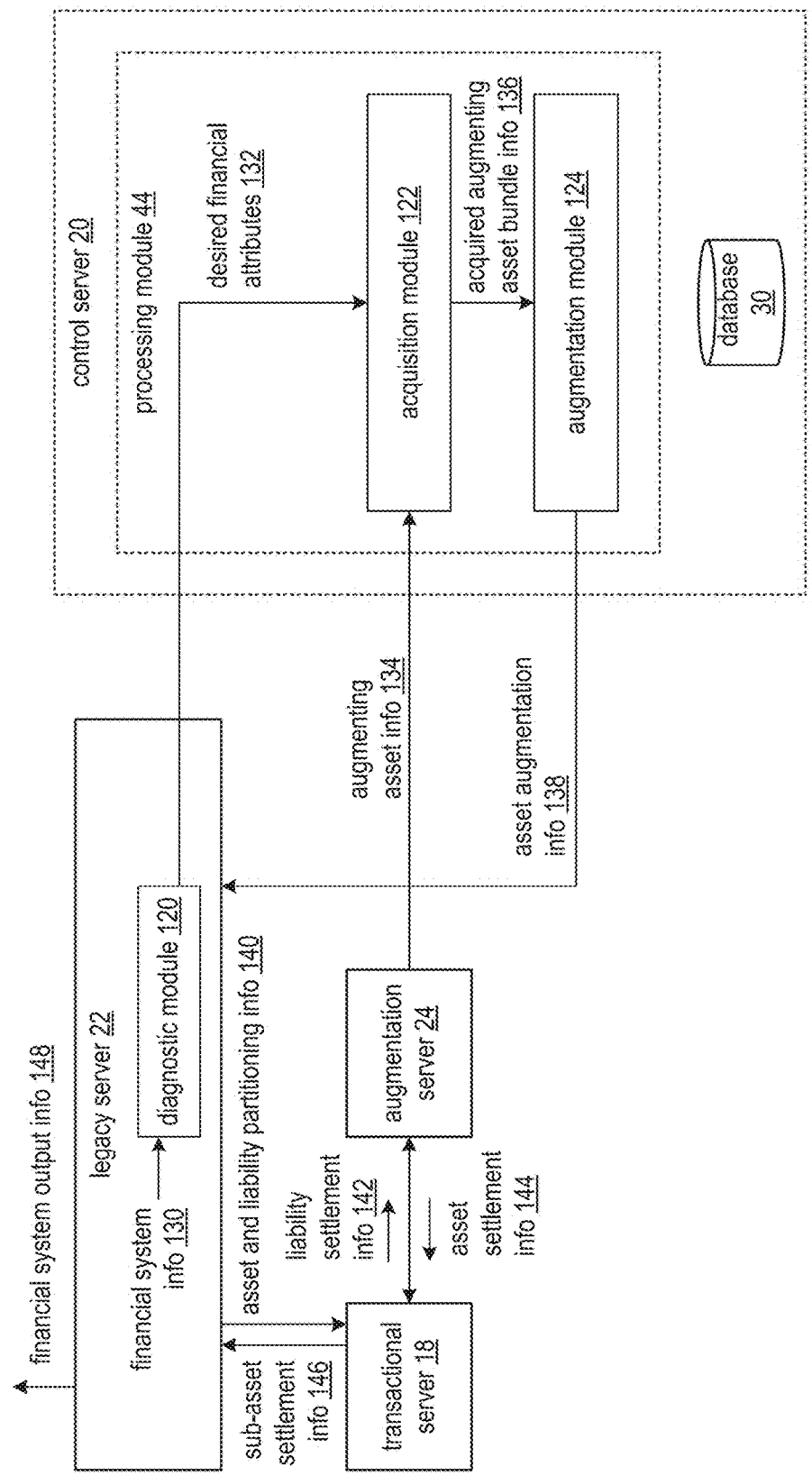
FIG. 8A is a schematic block diagram of another embodiment of a communication system in accordance with the present invention.

FIG. 8A is a schematic block diagram of another embodiment of a communication system that includes the legacy server 22 of FIG. 1, the transactional server 18 of FIG. 1, the augmentation server 24 of FIG. 1, and the control server 20 of FIG. 1. The legacy server 22 includes the diagnostic module 120 of FIG. 4A. The control server 20 includes the processing module 44 of FIG. 1 and the database 30 of FIG.

1. The processing module 44 includes the acquisition module 122 of FIG. 4A and the augmentation module 124 of FIG. 4A. This invention presents solutions where the communication system functions to facilitate asset reconfiguration and reassignment.

In an example of operation of the facilitating asset reconfiguration and reassignment, the diagnostic module 120 determines to evaluate a financial system associated with the legacy server 22. When evaluating the financial system, the diagnostic module 120 characterizes the financial system based on financial system information 130 to produce desired financial attributes 132 that includes a desired cash flow and a desired valuation lift.

The acquisition module 122 identifies augmenting asset preferences, accesses augmenting asset information 134 to extract candidate asset characteristics, down selects candidate assets that have characteristics that compare favorably to the augmenting asset preferences and to the desired financial attributes 132, determines financial contributions of each of the down selected candidate assets, and selects an asset selection approach. The acquisition module 122 further completes selection of assets from the down selected candidate assets to produce an augmenting asset bundle utilizing the selected asset selection approach, where an estimated financial contribution of the augmenting asset bundle compares favorably to the desired cash flow and valuation lift, and summarizes the augmenting asset bundle to reveal selected asset characteristics to produce acquired augmenting asset bundle information 136.

The augmentation module 124 facilitates identification of a custodial entity and an associated transactional server 18, selects a deconstruction approach for the acquired augmenting asset bundle where an estimated value of deconstructed asset elements compares favorably to one or more of the desired cash flow, the desired valuation lift, and other funding requirements (e.g., the transactional server 18 generates an estimated value, the augmentation module 124 generates the estimated value), generates title transfer information for the deconstructed asset elements, facilitates producing of the acquired augmenting asset bundle utilizing the deconstruction approach to produce the deconstructed asset elements (e.g., perform the deconstruction or request that another entity such as the legacy server 22 perform the deconstruction by issuing a request that includes selected asset titling information and the selected asset deconstruction approach. For instance, the augmentation module 124 issues asset augmentation information 138 to the legacy server 22, where the asset augmentation information 138 includes the selected asset titling information and the selected asset deconstruction approach along with a request that the legacy server 22 perform the deconstruction.

Having received the asset augmentation information 138, the legacy server 22 performs the deconstruction of the augmenting asset bundle to produce the deconstructed asset elements in accordance with the selected asset deconstruction approach, re-bundles deconstructed asset elements to produce two or more groupings, assigns title to each of the two or more groupings in accordance with the received titling information, and issues asset and liability partitioning information 140 to the transactional server 18, where the asset and liability partitioning information 140 includes asset deconstruction results and deconstructed asset element title information. For instance, a first title group of deconstructed elements is titled to the financial system of the legacy server 22 (e.g., a pension system) and a second title group of deconstructed elements is titled to the entity associated with the custodial entity transactional server 18.

Having received the asset and liability protection information 140 the transactional server 18 issues liability settlement information 142 to the augmentation server 24 in accordance with timing associated with a particular group of deconstructed elements titled to either the transactional server 18 or the legacy server 22 (e.g., life insurance policy premium payments, life insurance death benefit claims) and receives corresponding asset settlement information 144 (e.g., life insurance death benefit payments). The transactional server 18 issues sub-asset settlement information 146 to the legacy server 22 when receiving asset settlement information 144 to satisfy compensation for asset maturation in accordance with the titling information (e.g., a portion of the life insurance death benefit payments are forwarded to the legacy server 22 for utilization in the financial system). Having received a plurality of asset maturation payments (e.g., numerous sub-asset settlement information 146), the legacy server 22 facilitates issuing of financial system output information 148 (e.g., financial transactions to satisfy pension payments in accordance with a pension schedule for each pension participant).

Figure 8B:
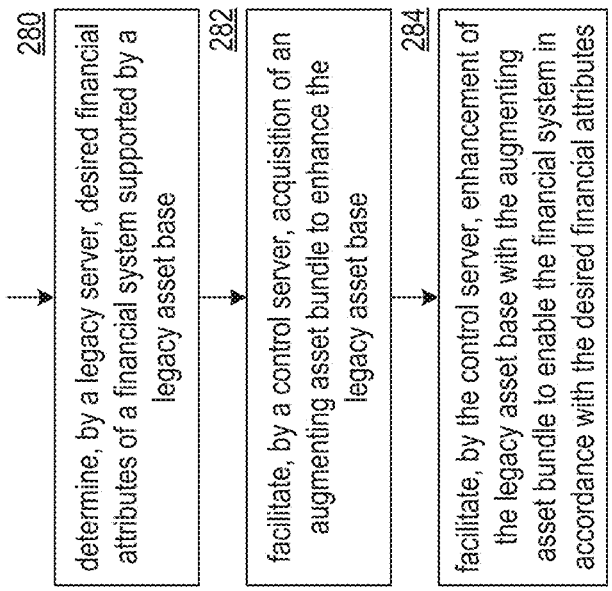
FIG. 8B is a logic diagram of another example of a method of enhancing a legacy asset base in accordance with the present invention.

FIG. 8B is a logic diagram of another example of a method of enhancing a legacy asset base that includes step 280 where a legacy server determines desired financial attributes of the financial system supported by a legacy asset base. For example, the legacy server determines to evaluate the financial system and characterizes the financial system to estimate a desired cash flow and a desired valuation lift when the financial system is underperforming.

The method continues at step 282 where a control server facilitates acquisition of an augmenting asset bundle to enhance the legacy asset base. For example, the control server identifies augmenting asset preferences, accesses augmenting asset information to extract candidate asset characteristics, down selects candidate assets that have characteristics that compare favorably to the augmenting asset preferences, determines financial contributions of each of the down selected candidate assets, selects an asset selection approach, completes the selection from the down selected candidate assets to produce the augmenting asset bundle utilizing the selected asset selection approach where an estimated financial contribution of the augmenting asset bundle compares favorably to the desired cash flow and desired valuation lift, and summarizes the augmenting asset bundle to reveal selected asset characteristics.

The method continues at step 284 where the control server facilitates enhancement of the legacy asset base with the augmenting asset bundle to enable the financial system in accordance with the desired financial attributes. For example, the control server facilitates identification of a custodial entity associated with a transactional server, selects a deconstruction approach for the acquired augmenting asset bundle where an estimated value of two or more groupings of deconstructed asset elements compares favorably to one or more of the desired cash flow, the desired valuation lift, and other funding requirements, generates titling information for the two or more groupings of the deconstructed asset elements, and facilitates producing of the two or more groupings of deconstructed asset elements utilizing the deconstruction approach.

The method described above in conjunction with the processing module can alternatively be performed by other modules of the communication system 10 of FIG. 1 or by other devices. In addition, at least one memory section (e.g., a computer readable memory, a non-transitory computer readable storage medium, a non-transitory computer readable memory organized into a first memory element, a second memory element, a third memory element, a fourth element section, a fifth memory element etc.) that stores operational instructions can, when executed by one or more processing modules of one or more computing devices (e.g., one or more servers, one or more user devices) of the communication system 10, cause the one or more computing devices to perform any or all of the method steps described above.

Figure 9A:
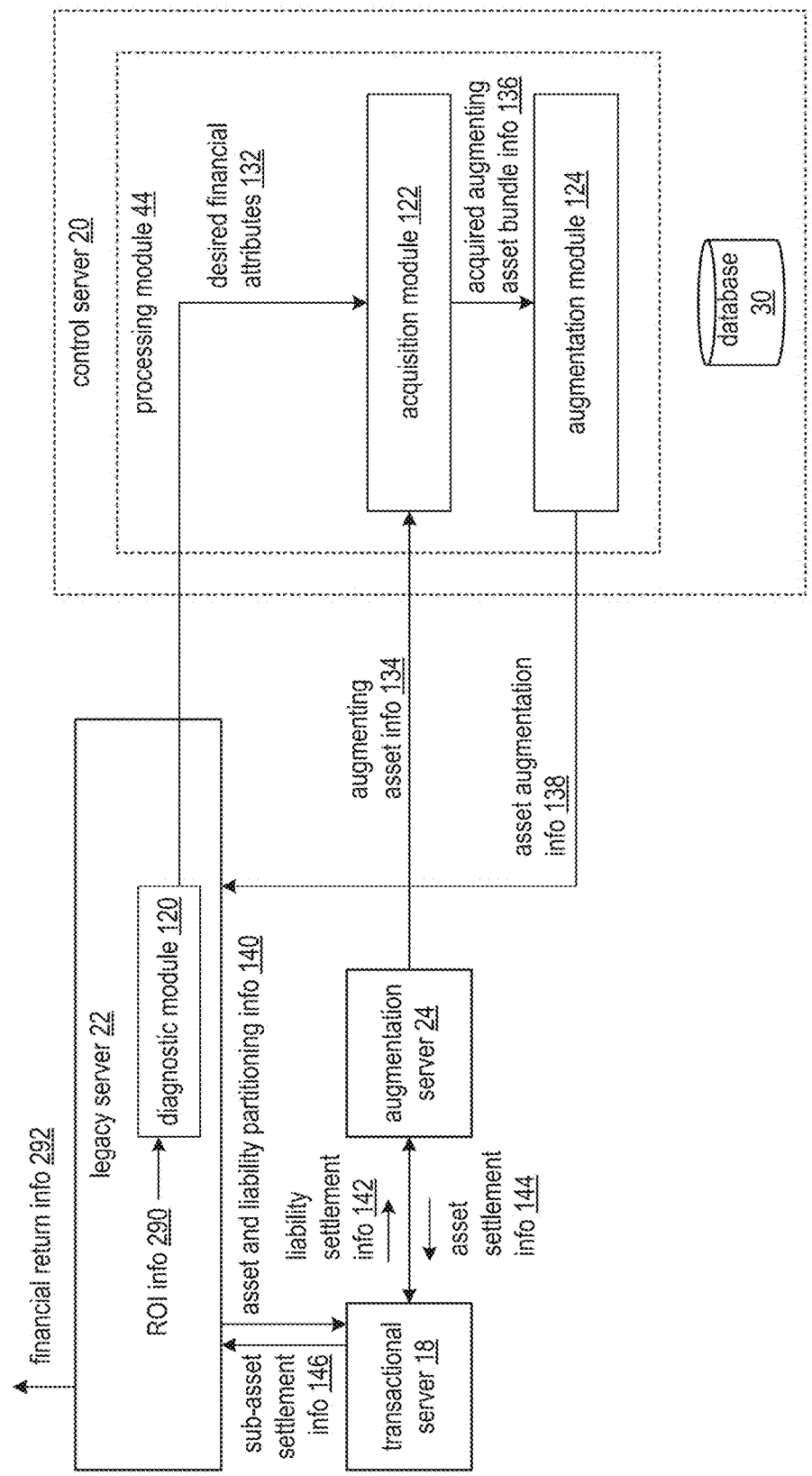
FIG. 9A is a schematic block diagram of another embodiment of a communication system in accordance with the present invention.

FIG. 9A is a schematic block diagram of another embodiment of a communication system that includes the legacy server 22 of FIG. 1, the transactional server 18 of FIG. 1, the augmentation server 24 of FIG. 1, and the control server 20 of FIG. 1. The legacy server 22 includes the diagnostic module 120 of FIG. 4A. The control server 20 includes the processing module 44 of FIG. 1 and the database 30 of FIG. 1. The processing module 44 includes the acquisition module 122 of FIG. 4A and the augmentation module 124 of FIG. 4A. This invention presents solutions where the communication system functions to facilitate asset reconfiguration and reassignment.

In an example of operation of the facilitating asset reconfiguration and reassignment, the diagnostic module 120 determines to evaluate return on investment (ROI) information associated with the legacy server 22. Such ROI information to be associated with one or more present or future asset bases, where an investment is expected to produce a return with various minimums for financial metrics such as a minimum ROI level, a time frame to achieve various absolute returns, minimum level of magnitudes of returns, etc. The legacy asset base will eventually produce returns that are summarized by the legacy server 22 as financial return information 292 (e.g., cash flow information, balance sheet information. When evaluating the ROI, the diagnostic module 120 characterizes the one or more asset bases from ROI information 290 to produce desired financial attributes 132 that includes a desired cash flow and a desired valuation lift.

The acquisition module 122 identifies augmenting asset preferences, accesses augmenting asset information 134 to extract candidate asset characteristics, down selects candidate assets that have characteristics that compare favorably to the augmenting asset preferences and to the desired financial attributes 132, determines financial contributions of each of the down selected candidate assets, and selects an asset selection approach. The acquisition module 122 further completes selection of assets from the down selected candidate assets to produce an augmenting asset bundle utilizing the selected asset selection approach, where an estimated financial contribution of the augmenting asset bundle compares favorably to the desired cash flow and valuation lift, and summarizes the augmenting asset bundle to reveal selected asset characteristics to produce acquired augmenting asset bundle information 136.

The augmentation module 124 facilitates identification of a custodial entity and an associated transactional server 18, selects a deconstruction approach for the acquired augmenting asset bundle where an estimated value of deconstructed asset elements compares favorably to one or more of the desired cash flow, the desired valuation lift, and other funding requirements (e.g., the transactional server 18 generates an estimated value, the augmentation module 124 generates the estimated value), generates title transfer information for the deconstructed asset elements, facilitates producing of the acquired augmenting asset bundle utilizing the deconstruction approach to produce the deconstructed asset elements (e.g., perform the deconstruction or request that another entity such as the legacy server 22 perform the deconstruction by issuing a request that includes selected asset titling information and the selected asset deconstruction approach. For instance, the augmentation module 124 issues asset augmentation information 138 to the legacy server 22, where the asset augmentation information 138 includes the selected asset titling information and the selected asset deconstruction approach along with a request that the legacy server 22 perform the deconstruction.

Having received the asset augmentation information 138, the legacy server 22 performs the deconstruction of the augmenting asset bundle to produce the deconstructed asset elements in accordance with the selected asset deconstruction approach, re-bundles deconstructed asset elements to produce two or more groupings, assigns title to each of the two or more groupings in accordance with the received titling information, and issues asset and liability partitioning information 140 to the transactional server 18, where the asset and liability partitioning information 140 includes asset deconstruction results and deconstructed asset element title information. For instance, a first title group of deconstructed elements is titled to the asset base of the legacy server 22 (e.g., a general investment fund) and a second title group of deconstructed elements is titled to the entity associated with the custodial entity transactional server 18.

Having received the asset and liability protection information 140 the transactional server 18 issues liability settlement information 142 to the augmentation server 24 in accordance with timing associated with a particular group of deconstructed elements titled to either the transactional server 18 or the legacy server 22 (e.g., life insurance policy premium payments, life insurance death benefit claims) and receives corresponding asset settlement information 144 (e.g., life insurance death benefit payments). The transactional server 18 issues sub-asset settlement information 146 to the legacy server 22 when receiving asset settlement information 144 to satisfy dividend payments or similar for asset maturation in accordance with the titling information (e.g., a portion of the life insurance death benefit payments are forwarded to the legacy server 22 for utilization in the asset base). Having received a plurality of asset maturation payments (e.g., numerous sub-asset settlement information 146), the legacy server 22 facilitates issuing of the financial return information 292 (e.g., financial transactions to satisfy general investment fund payments in accordance with a dividend payment schedule for each investment fund participant).

Figure 9B:
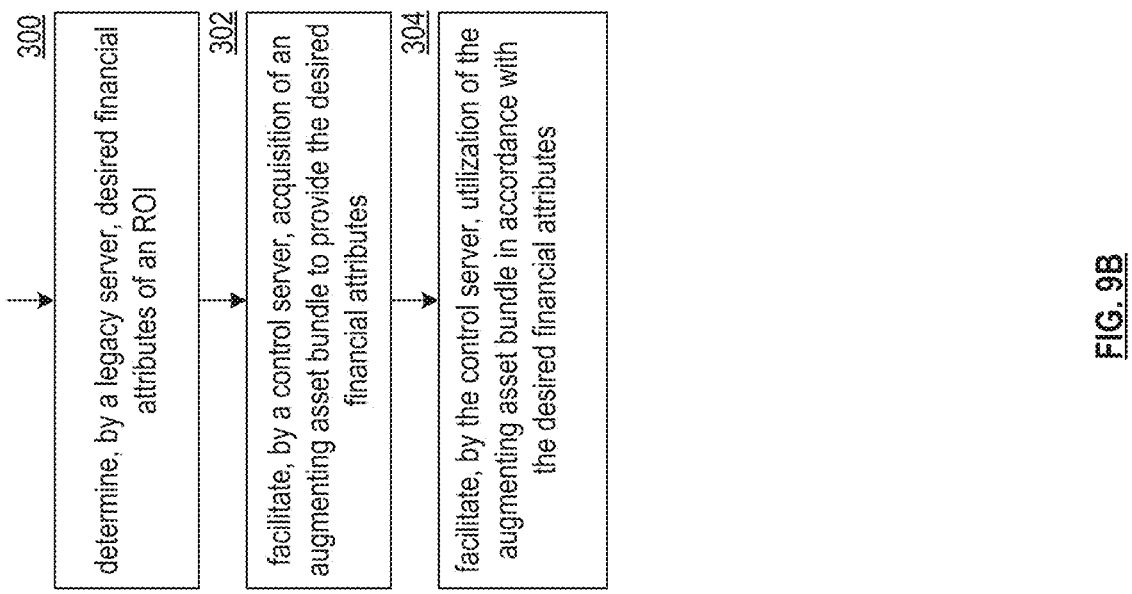
FIG. 9B is a logic diagram of an example of a method of acquisition of an augmenting asset bundle in accordance with the present invention.

FIG. 9B is a logic diagram of another example of a method of enhancing a legacy asset base that includes step 300 where a legacy server determines desired financial attributes of an ROI (e.g., of a general investment fund or similar). For example, the legacy server determines to evaluate the ROI of the legacy asset base and characterizes the acid-base to estimate a desired cash flow and a desired valuation lift.

The method continues at step 302 where a control server facilitates acquisition of an augmenting asset bundle to enhance the legacy asset base. For example, the control server identifies augmenting asset preferences, accesses augmenting asset information to extract candidate asset characteristics, down selects candidate assets that have characteristics that compare favorably to the augmenting asset preferences, determines financial contributions of each of the down selected candidate assets, selects an asset selection approach, completes the selection from the down selected candidate assets to produce the augmenting asset bundle utilizing the selected asset selection approach where an estimated financial contribution of the augmenting asset bundle compares favorably to the desired cash flow and desired valuation lift, and summarizes the augmenting asset bundle to reveal selected asset characteristics.

The method continues at step 304 where the control server facilitates enhancement of the legacy asset base with the augmenting asset bundle to enable the legacy asset in accordance with the desired financial attributes. For example, the control server facilitates identification of a custodial entity associated with a transactional server, selects a deconstruction approach for the acquired augmenting asset bundle where an estimated value of two or more groupings of deconstructed asset elements compares favorably to one or more of the desired cash flow, the desired valuation lift, and other funding requirements, generates titling information for the two or more groupings of the deconstructed asset elements, and facilitates producing of the two or more groupings of deconstructed asset elements utilizing the deconstruction approach to enable future results of the legacy asset base to compare favorably to the desired financial attributes.

The method described above in conjunction with the processing module can alternatively be performed by other modules of the communication system 10 of FIG. 1 or by other devices. In addition, at least one memory section (e.g., a computer readable memory, a non-transitory computer readable storage medium, a non-transitory computer readable memory organized into a first memory element, a second memory element, a third memory element, a fourth element section, a fifth memory element etc.) that stores operational instructions can, when executed by one or more processing modules of one or more computing devices (e.g., one or more servers, one or more user devices) of the communication system 10, cause the one or more computing devices to perform any or all of the method steps described above.

Figure 10A:
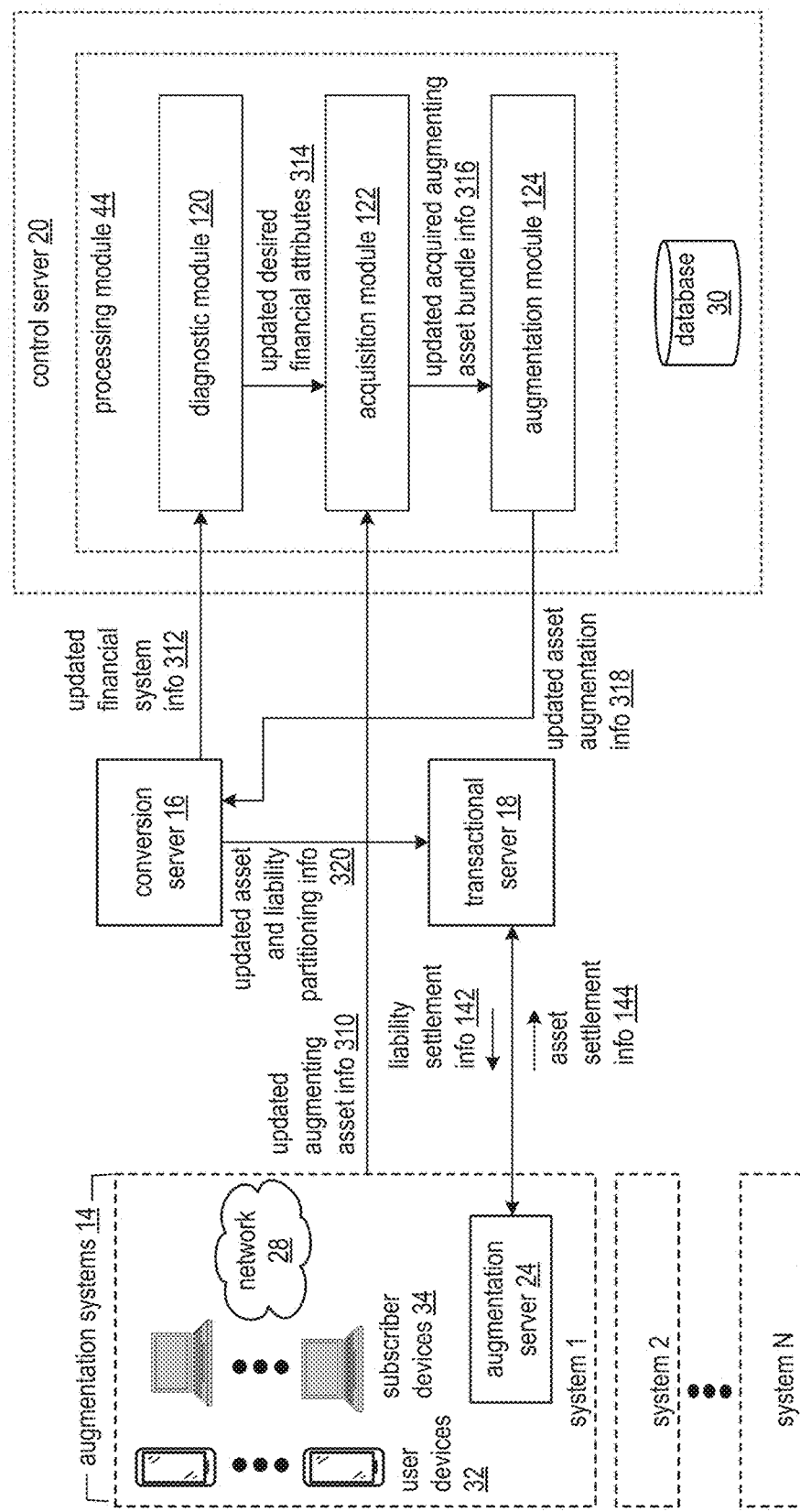
FIG. 10A is a schematic block diagram of another embodiment of a communication system in accordance with the present invention.

FIG. 10A is a schematic block diagram of another embodiment of a communication system that includes the plurality of N augmentation systems 14 of FIG. 1, the conversion server 16 of FIG. 1, the transactional server 18 of FIG. 1, and the control server 20 of FIG. 1. Each augmentation system 14 includes a portion of the network 28 of FIG. 1, the plurality of user devices 32 of FIG. 1, the plurality of subscriber devices 34 of FIG. 1, and the augmentation server 24 of FIG. 1. The control server 20 includes the processing module 44 FIG. 1 and the database 30 of FIG. 1. The processing module 44 includes the diagnostic module 120 of FIG. 4A, the acquisition module 122 of FIG. 4A, and the augmentation module 124 of FIG. 4. This invention presents solutions where the communication system functions to facilitate asset reconfiguration and reassignment.

In an example of operation of the facilitating of the asset reconfiguration and reassignment, the acquisition module 122 determines whether to update an acquired augmenting asset bundle. As a particular example, the acquisition module 122 receives updated desired financial attributes 314 from the diagnostic module 120 based on updated financial system information 312 from the conversion server 16 and detects that a change has occurred that will drive updated desired financial attributes 314 (e.g., a new desired cash flow is detected, a new desired valuation lift is detected).

As another particular example, the acquisition module 122 receives updated augmenting asset information 310 from one or more of a user device 32, a subscriber device 34, and the augmentation server 24, and detects that an attribute of an augmenting asset of the acquired augmented asset bundle compares favorably to an attribute threshold level (e.g., interpret updated augmenting asset information 310 from a user device 32 to extract the attribute, compare the attribute to a corresponding attribute threshold level, and indicate the favorable comparison when the attribute compares favorably to the attribute threshold level). Examples of attributes include user demographics, user lifestyle, user location user interests, user illness, user domicile location, user work location user career field, user family connections, user social connections user leisure time activities, user nutrition information, user DNA information, weather conditions associated with a proximal location to a user, and/or any other attribute associated with one or more users that may impact valuation of associated assets of an augmentation system. For instance, the acquisition module 122 detects a lifestyle change of a person associated with the user device 32, where the person is associated with a life insurance policy asset of the augmenting assets.

When updating the acquired augmenting asset bundle, the acquisition module 122 facilitates further augmenting asset acquisition to produce updated acquired augmenting asset bundle information 316. For example, the acquisition module 122 identifies augmenting asset preferences, accesses the updated augmenting asset information 310 to extract candidate asset characteristics, down selects candidate assets that have attributes that compare favorably to the augmenting asset preferences, determines financial contributions of each of the down selected candidate assets, and selects an asset selection approach (e.g., keep some prior assets, swaps and prior assets, add more assets, remove some assets). The selecting may be based on one or more of a predetermination, a request, a query response, and a previously utilized asset selection approach that is associated with favorable financial results.

When acquiring more assets, the acquisition module 122 completes the selection from the down selected candidate assets to produce the updated augmenting asset bundle utilizing the selected asset selection approach where an estimated financial contribution of the augmenting asset bundle compares favorably to a desired cash flow and a desired valuation lift. The acquisition module 122 summarizes the updated acquired asset bundle to reveal further selected asset characteristics included in updated acquired augmenting asset bundle information 316.

The augmentation module 124 facilitates updating of the acquired augmenting asset bundle to produce updated asset augmentation information 318. For example, the augmentation module 124 identifies a custodial entity associated with the transactional server 18, selects a deconstruction approach for the updated acquired augmenting asset bundle, where an estimated value of remaining deconstructed asset elements combined with further acquired deconstructed asset elements, when re-bundled in two or more groups, compares favorably to one or more of the desired cash flow, the desired valuation lift, and other funding requirements.

The augmentation module 124 generates updated titling information for the totality of deconstructed asset elements as a result of a new re-bundling plan and facilitates the construction of an updated acquired augmenting asset bundle utilizing the deconstruction approach to produce the further deconstructed asset elements (e.g., perform the deconstruction or request that another entity such as the conversion server 16 perform the deconstruction by issuing the updated asset augmentation information 318 to the conversion server 16). The updated asset augmentation information 318 includes one or more of the asset titling information, the selected asset deconstruction approach, and a request to perform the deconstruction.

The conversion server 16 issues updated asset and liability partitioning information 320 to the transactional server 18 based on the updated asset augmentation information 318. The transactional server 18 issues liability settlement information 142 to the augmentation server 24 from time to time and receives asset settlement information 144 from the augmentation server 24.

Figure 10B:
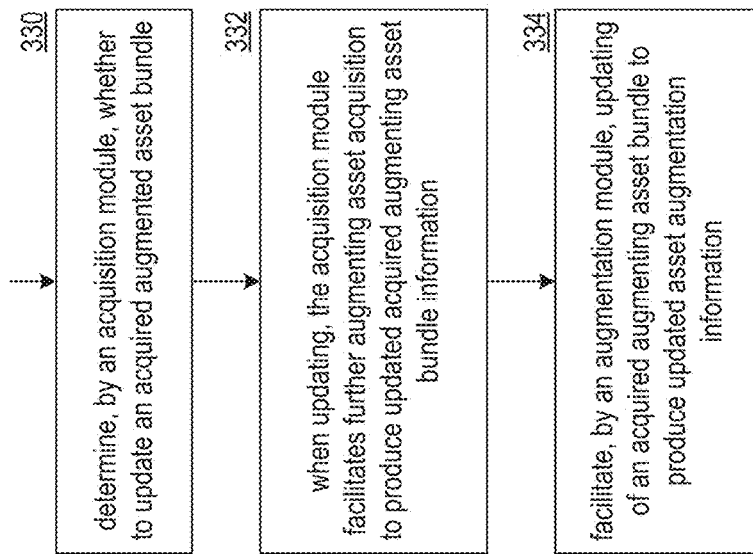
FIG. 10B is a logic diagram of an example of a method of updating an acquired augmenting asset bundle in accordance with the present invention.

FIG. 10B is a logic diagram of an example of a method of updating an acquired augmenting asset bundle that includes step 330 where an acquisition module determines whether to update an acquired augmented asset bundle. The determining may be based on one or more of interpreting updated desired financial attributes based on updated financial system information and detecting that an attribute of an augmenting asset of the acquired augmenting asset bundle compares favorably to an attribute threshold level (e.g., interpret updated augmenting asset information to extract the attribute, compare the attribute to a corresponding attribute threshold level, and indicate a favorable comparison when the attribute compares favorably to the attribute threshold level).

When updating, the method continues at step 332 where the acquisition module facilitates further augmenting asset acquisition to produce updated acquired augmented asset bundle information. For example, the acquisition module identifies augmenting asset preferences, accesses updated augmenting asset information to extract candidate asset characteristics, down selects candidate assets that have attributes that compare favorably to the augmenting asset preferences, determines financial contributions of each of the down selected candidate assets, selects an asset selection approach, completes the selection from the down selected candidate assets to produce the updated augmenting asset bundle utilizing the selected asset selection approach where an estimated financial contribution of the augmenting asset bundle compares favorably to a desired cash flow and a desired valuation lift, and summarize the updated augmenting asset bundle to reveal further selected asset characteristics.

The method continues at step 334 where an augmentation module facilitates updating of an acquired augmenting asset bundle to produce updated asset augmentation information. For example, the augmentation module identifies a custodial entity of an associated transactional server, selects a deconstruction approach for the updated acquired augmented asset bundle where an estimated value of remaining deconstructed asset elements combined with further acquired deconstructed asset elements compares favorably to one or more of the desired cash flow, the desired valuation lift, and other funding requirements, generates updated titling information for the totality of deconstructed asset elements, facilitates the construction of an updated acquired augmenting asset bundle utilizing the deconstruction approach to produce further deconstructed asset elements, where the transactional server utilizes the further elements.

The method described above in conjunction with the processing module can alternatively be performed by other modules of the communication system 10 of FIG. 1 or by other devices. In addition, at least one memory section (e.g., a computer readable memory, a non-transitory computer readable storage medium, a non-transitory computer readable memory organized into a first memory element, a second memory element, a third memory element, a fourth element section, a fifth memory element etc.) that stores operational instructions can, when executed by one or more processing modules of one or more computing devices (e.g., one or more servers, one or more user devices) of the communication system 10, cause the one or more computing devices to perform any or all of the method steps described above.

Figure 11A:
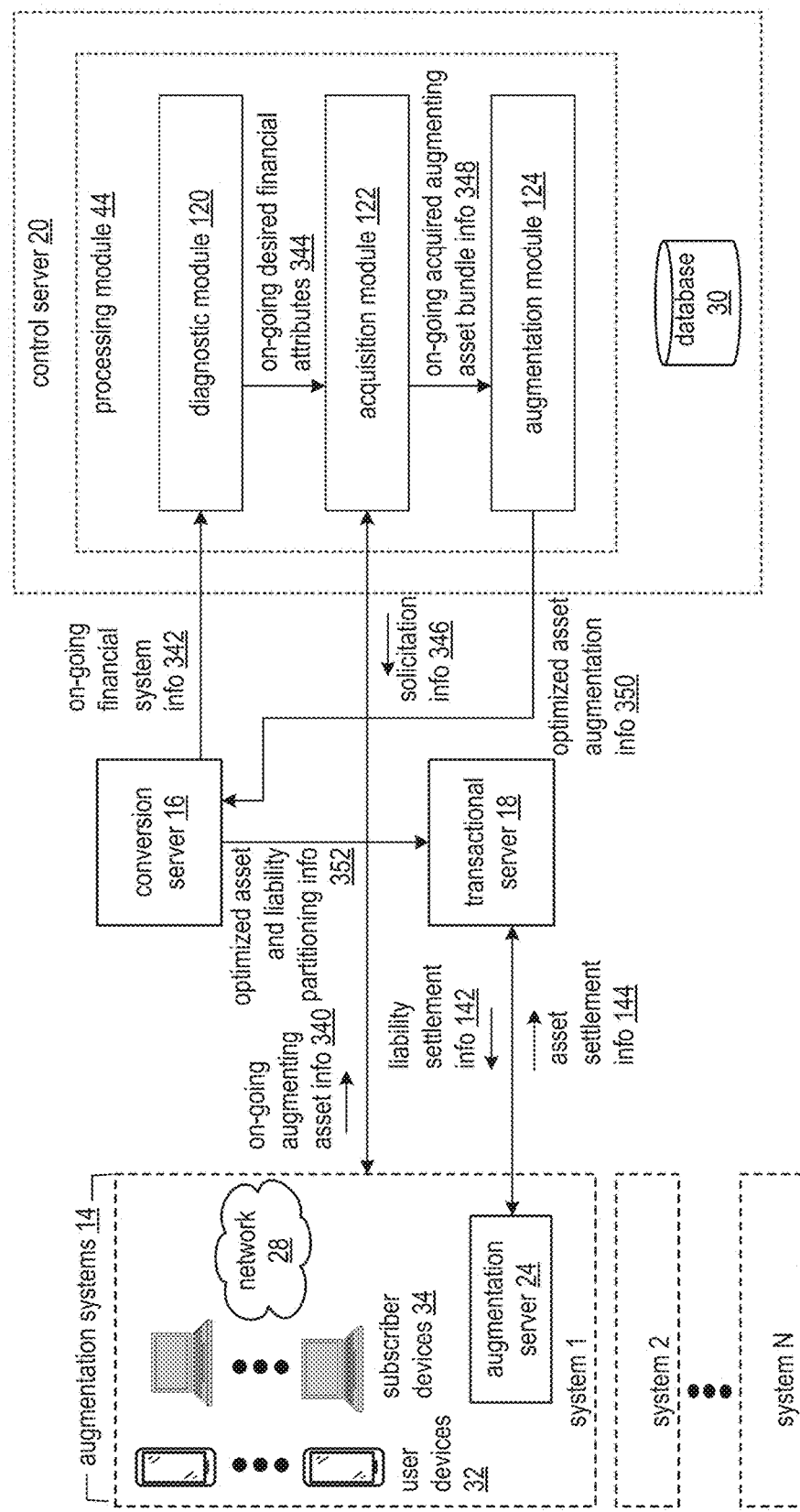
FIG. 11A is a schematic block diagram of another embodiment of a communication system in accordance with the present invention.

FIG. 11A is a schematic block diagram of another embodiment of a communication system that includes the plurality of N augmentation systems 14 of FIG. 1, the conversion server 16 of FIG. 1, the transactional server 18 of FIG. 1, and the control server 20 of FIG. 1. Each augmentation system 14 includes a portion of the network 28 of FIG. 1, the plurality of user devices 32 of FIG. 1, the plurality of subscriber devices 34 of FIG. 1, and the augmentation server 24 of FIG. 1. The control server 20 includes the processing module 44 FIG. 1 and the database 30 of FIG. 1. The processing module 44 includes the diagnostic module 120 of FIG. 4A, the acquisition module 122 of FIG. 4A, and the augmentation module 124 of FIG. 4. This invention presents solutions where the communication system functions to facilitate asset reconfiguration and reassignment.

In an example of operation of the facilitating of the asset reconfiguration and reassignment, the acquisition module 122 determines whether to update an asset base associated with the conversion server 16 (e.g., where a pension system sponsor is associated with the conversion server 16). As a particular example, the acquisition module 122 receives ongoing desired financial attributes 344 from the diagnostic module 120 based on ongoing financial system information 342 from the conversion server 16 and detects that a change has occurred that will drive ongoing desired financial attributes 344 (e.g., a new desired cash flow is detected, a new desired valuation lift is detected).

As another particular example, the acquisition module 122 receives an indication from one or more of the transactional server 18, the conversion server 16, the augmentation server 24, one or more user devices 32, and one or more subscriber devices 34, that a trigger condition has occurred associated with one or more of the asset base and or with one or more available assets associated with one or more of the augmentation systems 14. For example, the acquisition module 122 interprets ongoing augmenting asset information 340 from a first user device 32, where the interpretation indicates that an asset associated with the user of the first user device 32 has favorable attributes as compared to augmenting asset preferences and may be available for purchase.

When augmenting the asset base, the acquisition module 122 facilitates augmenting asset acquisition utilizing solicitation of a plurality of assets associated with one or more augmentation systems 14 to produce ongoing acquired augmenting asset bundle information 348. For example, the acquisition module 122 identifies the augmenting asset preferences, accesses the ongoing augmenting asset information 340 to extract candidate asset characteristics, down selects candidate assets that compare favorably to the augmenting asset preferences, determines financial contributions of each of the down selected candidate assets, selects an asset selection approach, complete selection from the down selected candidate assets to produce an updated augmenting asset bundle utilizing the selected asset selection approach where an estimated financial contribution of the augmenting asset bundle compares favorably to desired cash flow and desired valuation lift, and summarizes the updated augmenting asset bundle to reveal further selected asset characteristics in ongoing acquired augmenting asset bundle information 348, where the acquisition module 122 issues solicitation information 346 to the corresponding one or more augmentation systems 14 to invoke a new agreement to sell an asset (e.g., sends a solicitation message to the first user device 32), and completes the acquiring of the selected assets.

The augmentation module 124 facilitates updating of the acquired augmenting asset bundle to produce optimized asset augmentation information 350. For example, the augmentation module 124 identifies a custodial entity associated with the transactional server 18, selects a deconstruction approach for the updated acquired augmenting asset bundle, where an estimated value of remaining deconstructed asset elements combined with further acquired deconstructed asset elements, when re-bundled in two or more groups, compares favorably to one or more of the desired cash flow, the desired valuation lift, and other funding requirements.

The augmentation module 124 generates updated titling information for the totality of deconstructed asset elements as a result of a new re-bundling plan and facilitates the construction of an updated acquired augmenting asset bundle utilizing the deconstruction approach to produce the further deconstructed asset elements (e.g., perform the deconstruction or request that another entity such as the conversion server 16 perform the deconstruction by issuing the updated asset augmentation information 318 to the conversion server 16). The optimized asset augmentation information 350 includes one or more of the asset titling information, the selected asset deconstruction approach, and a request to perform the deconstruction.

The conversion server 16 issues optimized asset and liability partitioning information 352 to the transactional server 18 based on the optimized asset augmentation information 350. The transactional server 18 issues liability settlement information 142 to the augmentation server 24 from time to time and receives asset settlement information 144 from the augmentation server 24.

Figure 11B:
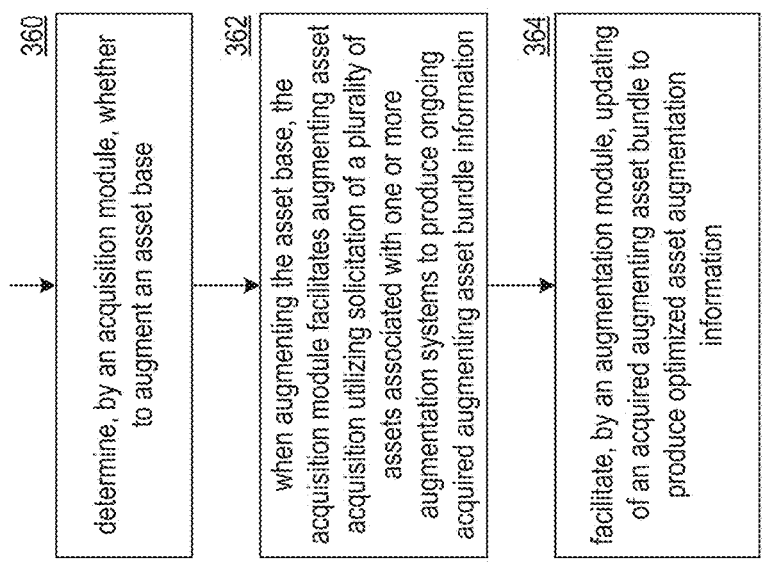
FIG. 11B is a logic diagram of another example of a method of updating an acquired augmenting asset bundle in accordance with the present invention.

FIG. 11B is a logic diagram of another example of a method of updating an acquired augmenting asset bundle that includes step 360 where an acquisition module determines whether to augment an asset base. The determining may be based on one or more of interpreting updated desired financial attributes based on on-going financial system information, detecting that an attribute of an augmenting asset of the acquired augmenting asset bundle compares favorably to an attribute threshold level (e.g., interpret on-going augmenting asset information to extract the attribute, compare the attribute to a corresponding attribute threshold level, and indicate a favorable comparison when the attribute compares favorably to the attribute threshold level), and receiving an indication of an unfavorable condition associated with the asset base.

When updating the asset base, the method continues at step 362 where the acquisition module facilitates further augmenting asset acquisition utilizing solicitation of a plurality of assets associated with one or more augmentation systems to produce on-going acquired augmented asset bundle information. For example, the acquisition module identifies augmenting asset preferences, accesses on-going augmenting asset information to extract candidate asset characteristics, down selects candidate assets that have attributes that compare favorably to the augmenting asset preferences, determines financial contributions of each of the down selected candidate assets, selects an asset selection approach, completes the selection from the down selected candidate assets to produce the updated augmenting asset bundle utilizing the selected asset selection approach where an estimated financial contribution of the augmenting asset bundle compares favorably to a desired cash flow and a desired valuation lift, summarizes the updated augmenting asset bundle to reveal further selected asset characteristics, and issues solicitation information to the corresponding one or more augmentation systems (e.g., send a solicitation message to the user device to invoke a status change when asset associated with the user device from unavailable to available for sale).

The method continues at step 364 where an augmentation module facilitates updating of an acquired augmenting asset bundle to produce optimized asset augmentation information. For example, the augmentation module identifies a custodial entity of an associated transactional server, selects a deconstruction approach for the updated acquired augmented asset bundle where an estimated value of remaining deconstructed asset elements combined with further acquired deconstructed asset elements compares favorably to one or more of the desired cash flow, the desired valuation lift, and other funding requirements, generates updated titling information for the totality of deconstructed asset elements, and facilitates the construction of an updated acquired augmenting asset bundle utilizing the deconstruction approach to produce further deconstructed asset elements, where the transactional server utilizes the further elements.

The method described above in conjunction with the processing module can alternatively be performed by other modules of the communication system 10 of FIG. 1 or by other devices. In addition, at least one memory section (e.g., a computer readable memory, a non-transitory computer readable storage medium, a non-transitory computer readable memory organized into a first memory element, a second memory element, a third memory element, a fourth element section, a fifth memory element etc.) that stores operational instructions can, when executed by one or more processing modules of one or more computing devices (e.g., one or more servers, one or more user devices) of the communication system 10, cause the one or more computing devices to perform any or all of the method steps described above.

Figure 12A:
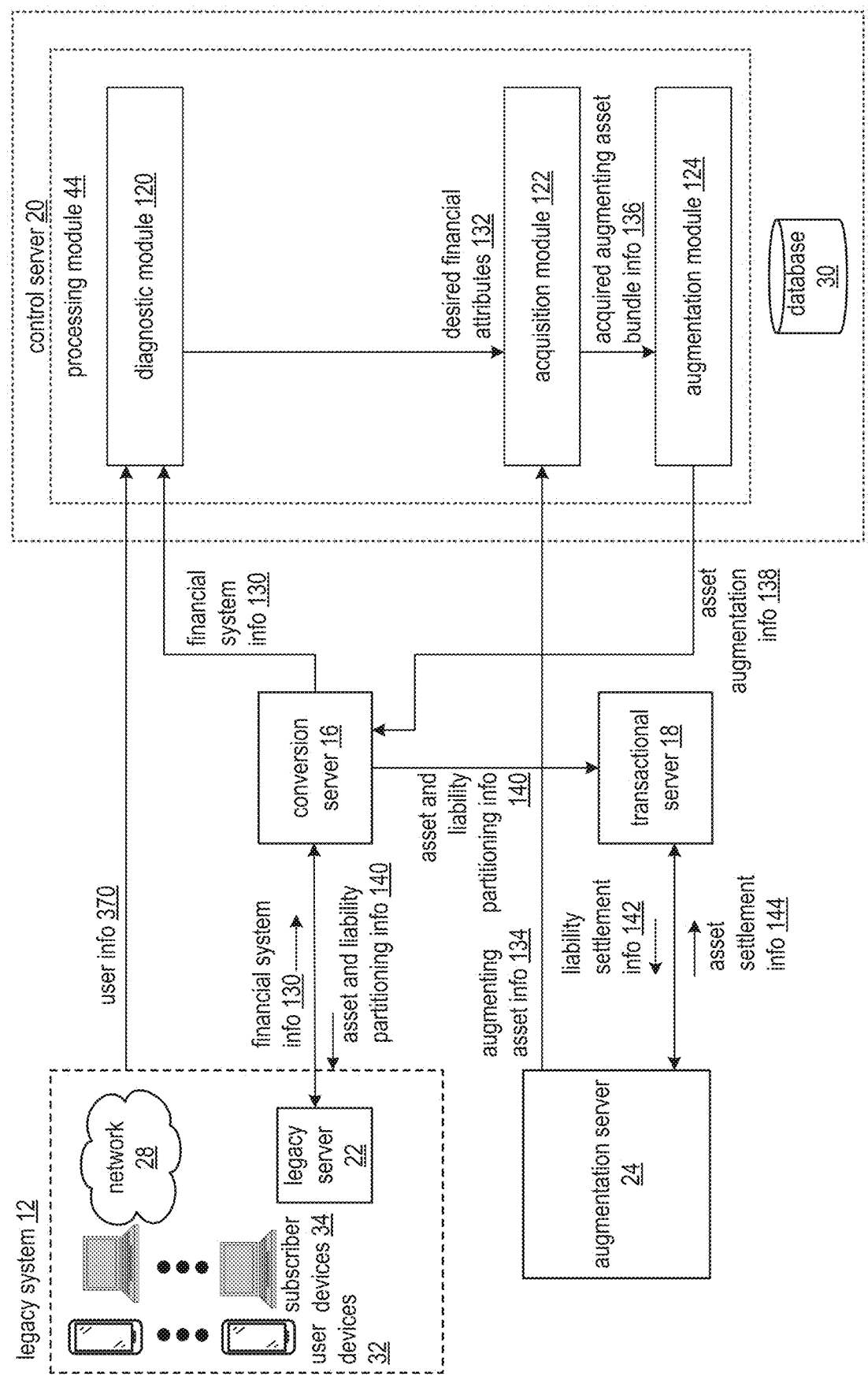
FIG. 12A is a schematic block diagram of another embodiment of a communication system in accordance with the present invention.

FIG. 12A is a schematic block diagram of another embodiment of a communication system that includes the legacy system 12 of FIG. 1, the conversion server 16 of FIG. 1, the transactional server 18 of FIG. 1, the augmentation server 24 of FIG. 1, and the control server 20 of FIG. 1. The legacy system 12 includes a portion of the network 28 of FIG. 1, the plurality of user devices 32 of FIG. 1, the plurality of subscriber devices 34 of FIG. 1, and the legacy server 22 of FIG. 1. The control server 20 includes the processing module 44 FIG. 1 and the database 30 of FIG. 1. The processing module 44 includes the diagnostic module 120 of FIG. 4A, the acquisition module 122 of FIG. 4A, and the augmentation module 124 of FIG. 4. This invention presents solutions where the communication system functions to facilitate asset reconfiguration and reassignment.

In an example of operation of the facilitating of the asset reconfiguration and reassignment, the diagnostic module 120 determines whether to evaluate a financial system associated with the legacy system 12. The determining includes interpreting user information 370 to predict viability of the financial system. For example, the diagnostic module 120 analyzes user demographic driven cash flow changes, changes in the number of users of the legacy system 12, lifestyle changes of users associated with the user devices 32 and/or the subscriber devices 34, and risk levels associated with the legacy system 12 (e.g., solvency or ability to meet financial commitments). For instance, the diagnostic module 120 receives user information 370 from a plurality of user devices 32, where the user information 370 includes data associated with a plurality of users, where the data has at least one correlation to future financial commitments of the financial system associated with the legacy system 12 (e.g., lifestyle changes affecting average expected life expectancy thus correlated to timing and amount of pension benefit payments when the financial system is a pension system). When metrics of the user information 370 compare unfavorably to desired metric ranges (e.g., implying underfunding or over funding of future financial commitments), the diagnostic module 120 indicates to evaluate the financial system.

When evaluating the financial system, the diagnostic module 120 characterizes the financial system to produce desired financial attributes 132 including a desired cash flow and a desired valuation lift based on user information 370 and financial system information 130. For example, the desired cash flow and valuation lift is raised when an interpretation of the user information 370 indicates that life expectancies are longer requiring increased future financial commitments (e.g., further pension benefit payouts when the financial system is a pension system).

The acquisition module 122 analyzes the desired financial attributes 132 and received augmenting asset information 134 to produce acquired augmenting asset bundle information 136. For example, the acquisition module 122 identifies augmenting asset preferences, accesses the augmenting asset information 134 to extract candidate asset characteristics, down selects candidate assets that compare favorably to the augmenting asset preferences, determines financial contributions of each of the down selected candidate assets, selects an asset selection approach, complete selection from the down selected candidate assets to produce the augmenting asset bundle utilizing the selected asset selection approach, where an estimated financial contribution of the augmenting asset bundle compares favorably to the desired cash flow and the desired valuation lift, and summarizes the augmenting asset bundle to reveal selected asset characteristics of the acquired augmenting asset bundle information 136.

The augmentation module 124 facilitates construction of an acquired augmenting asset bundle to produce asset augmentation information 138. For example, the augmentation module 124 identifies a custodial entity associated with the transactional server 18, selects a deconstruction approach for the acquired augmenting asset bundle, where an estimated value of deconstructed asset elements compares favorably to one or more of the desired cash flow, the desired valuation lift, and other funding requirements, generates titling information for the deconstructed asset elements (e.g., when partitioned into two or more groupings), facilitates the construction of the acquired augmenting asset bundle utilizing the deconstruction approach to produce the deconstructed asset elements (e.g., performing the deconstruction requesting that the conversion server 16, or another entity perform the deconstruction), and sending the asset augmentation information 138 to the conversion server 16.

The conversion server 16 issues asset and liability partition information 140 to the legacy server 22 and to the transactional server 18 based on the asset augmentation information 138. The transactional server 18 issues liability settlement information 142 to the augmentation server 24 in accordance with the asset and liability partition information 140. The augmentation server 24 issues asset settlement information 144 to the transactional server 18 in accordance with the liability settlement information 142 and the asset and liability partition information 140. FIG. 12B is a logic diagram of another example of a method of updating an acquired augmenting asset bundle that includes step 380 where a diagnostic module determines whether to evaluate, based on user information, a financial system. The determining includes interpreting the user information to predict viability of the financial system (e.g., user demographic driven cash flow changes) and indicates to evaluate when metrics associated with the user information become unfavorable (e.g., when compared to desirable metrics, when compared to acceptable rate of change metrics).

When evaluating the financial system, the method continues at step 382 where the diagnostic module characterizes the financial system to produce desired financial attributes including a desired cash flow and a desired valuation lift. For example, the diagnostic module analyzes financial system information and the user information to produce the desired financial attributes (e.g., correlate user information associated with each user to a portion of the desired financial attributes, aggregate the portions to produce the desired financial attributes for the financial system).

The method continues at step 384 where an acquisition module analyzes the desired financial attributes and received augmenting asset information to produce acquired augmenting asset bundle information. For example, the acquisition module identifies augmenting asset preferences, accesses augmenting asset information to extract candidate asset characteristics, down selects candidate assets having attributes that compare favorably to the augmenting asset preferences, determines financial contributions of each of the down selected candidate assets, selects an asset selection approach, completes selection from the down selected candidate assets to produce the augmenting asset bundle utilizing the selected asset selection approach where an estimated financial contribution of the augmenting asset bundle compares favorably to the desired cash flow and valuation lift, and summarizes the augmenting asset bundle to reveal selected asset characteristics.

The method continues at step 386 where an augmentation module facilitates construction of an acquired augmenting asset bundle to produce asset augmentation information. For example, the augmentation module identifies a custodial entity, selects a deconstruction approach for the acquired augmenting asset bundle where an estimated value of particularly grouped deconstructed asset elements compares favorably to one or more of the desired cash flow, the desired valuation lift, and other funding requirements, generates titling information for two or more groupings of the deconstructed asset elements, facilitates the construction of the acquired augmenting asset bundle utilizing the deconstruction approach to produce the deconstructed asset elements for grouping into the two or more groupings, where at least one of the groupings is utilized to augment the financial system.

The method described above in conjunction with the processing module can alternatively be performed by other modules of the communication system 10 of FIG. 1 or by other devices. In addition, at least one memory section (e.g., a computer readable memory, a non-transitory computer readable storage medium, a non-transitory computer readable memory organized into a first memory element, a second memory element, a third memory element, a fourth element section, a fifth memory element etc.) that stores operational instructions can, when executed by one or more processing modules of one or more computing devices (e.g., one or more servers, one or more user devices) of the communication system 10, cause the one or more computing devices to perform any or all of the method steps described above.

Figure 13A:
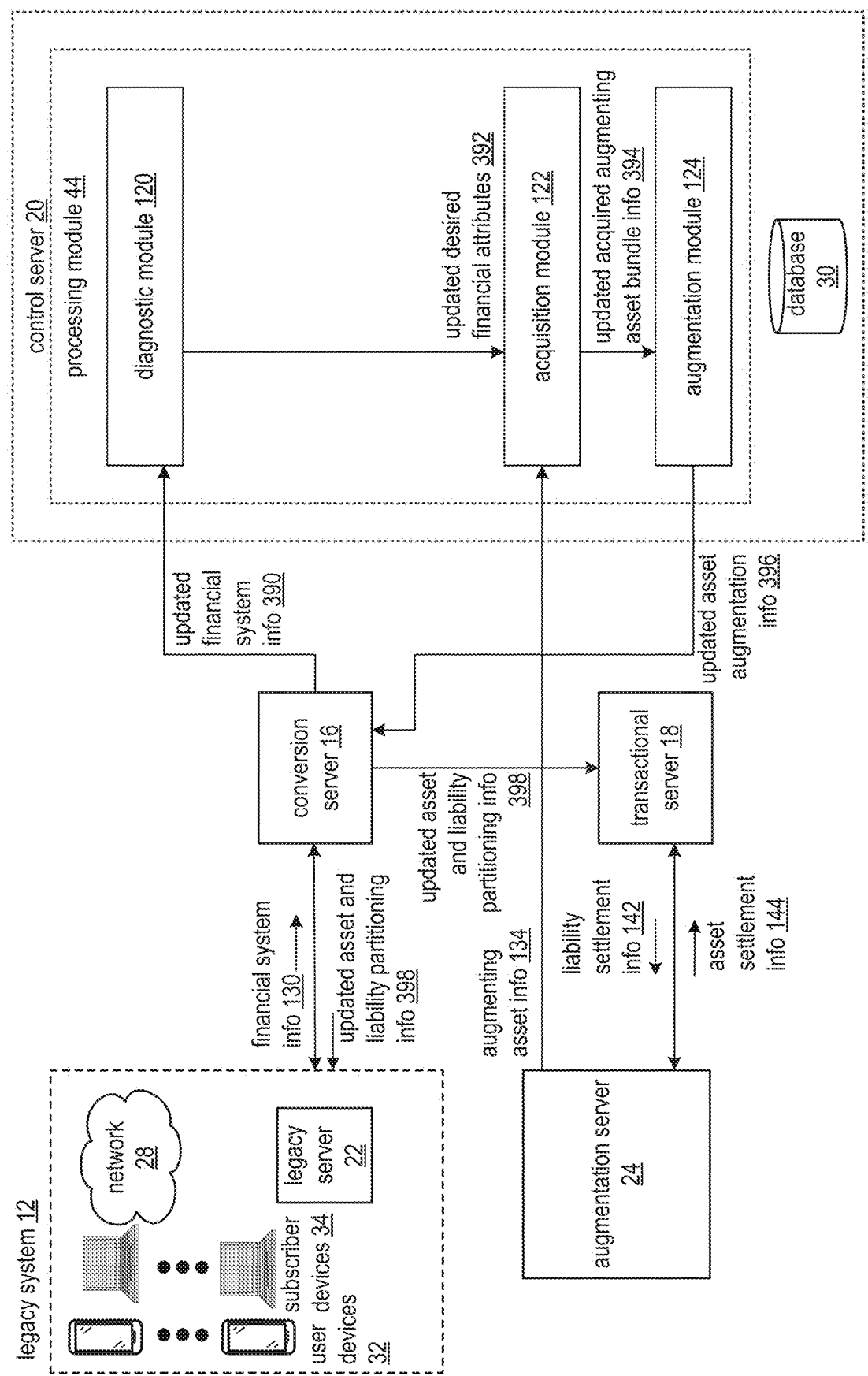
FIG. 13A is a schematic block diagram of another embodiment of a communication system in accordance with the present invention.

FIG. 13A is a schematic block diagram of another embodiment of a communication system that includes the legacy system 12 of FIG. 1, the conversion server 16 of FIG. 1, the transactional server 18 of FIG. 1, the augmentation server 24 of FIG. 1, and the control server 20 of FIG. 1. The legacy system 12 includes a portion of the network 28 of FIG. 1, the plurality of user devices 32 of FIG. 1, the plurality of subscriber devices 34 of FIG. 1, and the legacy server 22 of FIG. 1. The control server 20 includes the processing module 44 FIG. 1 and the database 30 of FIG. 1. The processing module 44 includes the diagnostic module 120 of FIG. 4A, the acquisition module 122 of FIG. 4A, and the augmentation module 124 of FIG. 4. This invention presents solutions where the communication system functions to facilitate asset reconfiguration and reassignment.

In an example of operation of the facilitating of the asset reconfiguration and reassignment, the diagnostic module 120 determines whether to evaluate a financial system associated with the legacy system 12. The determining includes interpreting user information 370 to predict viability of the financial system. For example, the diagnostic module 120 analyzes updated financial system information 390 received from the conversion server 16, where the conversion server 16 receives financial system information 130 from the legacy system 12 and indicates to evaluate the financial system when metrics of the updated financial system information 390 compares unfavorably to desired metric ranges (e.g., risk levels associated with the legacy system 12, solvency of the financial system, ability to meet financial commitments).

When evaluating the financial system, the diagnostic module 120 characterizes the financial system to produce updated desired financial attributes 392 including a desired cash flow and a desired valuation lift based on the updated financial system information 390. For example, the desired cash flow and valuation lift are raised when an interpretation of the updated financial system information 390 indicates that unexpected high levels of commitment payouts are requiring increased future financial commitments (e.g., further pension benefit payouts when the financial system is a pension system).

The acquisition module 122 analyzes the updated desired financial attributes 392 and received augmenting asset information 134 to produce updated acquired augmenting asset bundle information 394. For example, the acquisition module 122 identifies augmenting asset preferences, accesses the augmenting asset information 134 to extract candidate asset characteristics, down selects candidate assets that compare favorably to the augmenting asset preferences, determines financial contributions of each of the down selected candidate assets, selects an asset selection approach, completes selection from the down selected candidate assets to produce the augmenting asset bundle utilizing the selected asset selection approach, where an estimated financial contribution of the augmenting asset bundle compares favorably to the desired cash flow and the desired valuation lift, and summarizes the augmenting asset bundle to reveal selected asset characteristics of the updated acquired augmenting asset bundle information 394.

The augmentation module 124 facilitates construction of an acquired augmenting asset bundle to produce updated asset augmentation information 396. For example, the augmentation module 124 identifies a custodial entity associated with the transactional server 18, selects a deconstruction approach for the acquired augmenting asset bundle, where an estimated value of a particular grouping of deconstructed asset elements compares favorably to one or more of the desired cash flow, the desired valuation lift, and other funding requirements, generates titling information for one or more groupings of the deconstructed asset elements (e.g., when partitioned into the two or more groupings), facilitates the construction of the acquired augmenting asset bundle utilizing the deconstruction approach to produce the deconstructed asset elements (e.g., performing the deconstruction or requesting that the conversion server 16, or another entity perform the deconstruction), and sending the updated asset augmentation information 396 to the conversion server 16.

The conversion server 16 issues updated asset and liability partition information 398 to the legacy server 22 and to the transactional server 18 based on the updated asset augmentation information 396. The transactional server 18 issues liability settlement information 142 to the augmentation server 24 in accordance with the updated asset and liability partition information 398 and the augmentation server 24 issues asset settlement information 144 to the transactional server 18 in accordance with the liability settlement information 142 and the updated asset and liability partition information 398.

Figure 13B:
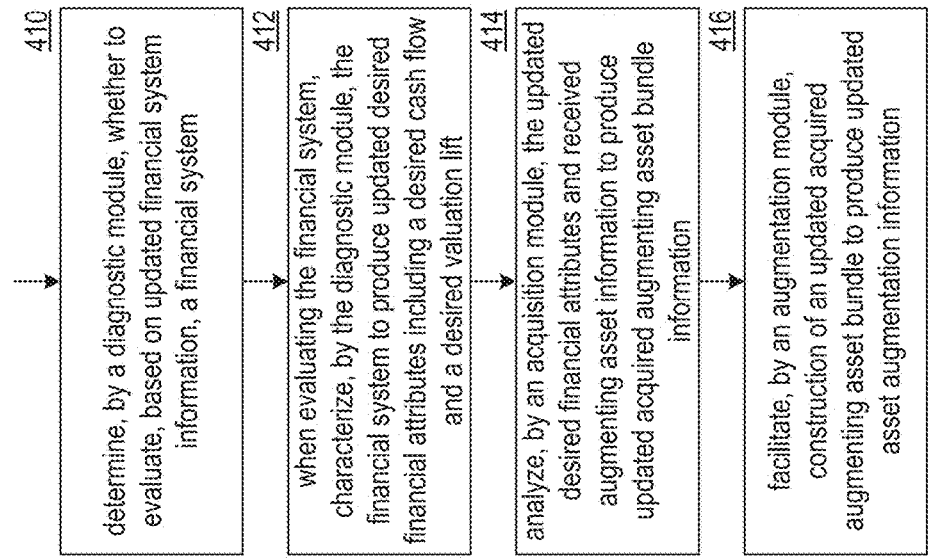
FIG. 13B is a logic diagram of another example of a method of updating an acquired augmenting asset bundle in accordance with the present invention.

FIG. 13B is a logic diagram of another example of a method of updating an acquired augmenting asset bundle that includes step 410 where a diagnostic module determines whether to evaluate, based on updated financial system information, a financial system. The determining includes interpreting the financial system information to predict viability of the financial system (e.g., estimated future cash flow changes) and indicates to evaluate when metrics associated with the financial system information become unfavorable (e.g., when compared to desirable metrics, when compared to acceptable rate of change metrics).

When evaluating the financial system, the method continues at step 412 where the diagnostic module characterizes the financial system to produce desired financial attributes including a desired cash flow and a desired valuation lift. For example, the diagnostic module analyzes the financial system information to produce the desired financial attributes (e.g., interpret updated aspects of the financial system information to look for required variances of a previously determined desired cash flow and a previously determined desired valuation lift).

The method continues at step 414 where an acquisition module analyzes the updated desired financial attributes and received augmenting asset information to produce updated acquired augmenting asset bundle information. For example, the acquisition module identifies augmenting asset preferences, accesses augmenting asset information to extract candidate asset characteristics, down selects candidate assets having attributes that compare favorably to the augmenting asset preferences, determines financial contributions of each of the down selected candidate assets, selects an asset selection approach, completes selection from the down selected candidate assets to produce the augmenting asset bundle utilizing the selected asset selection approach where an estimated financial contribution of the augmenting asset bundle compares favorably to the desired cash flow and valuation lift, and summarizes the augmenting asset bundle to reveal selected asset characteristics.

The method continues at step 416 where an augmentation module facilitates construction of an updated acquired augmenting asset bundle to produce updated asset augmentation information. For example, the augmentation module identifies a custodial entity, selects a deconstruction approach for the updated acquired augmenting asset bundle where an estimated value of particularly grouped deconstructed asset elements compares favorably to one or more of the desired cash flow, the desired valuation lift, and other funding requirements, generates titling information for two or more groupings of the deconstructed asset elements, facilitates the construction of the updated acquired augmenting asset bundle utilizing the deconstruction approach to produce the deconstructed asset elements for grouping into the two or more groupings, where at least one of the groupings is utilized to augment the financial system.

The method described above in conjunction with the processing module can alternatively be performed by other modules of the communication system 10 of FIG. 1 or by other devices. In addition, at least one memory section (e.g., a computer readable memory, a non-transitory computer readable storage medium, a non-transitory computer readable memory organized into a first memory element, a second memory element, a third memory element, a fourth element section, a fifth memory element etc.) that stores operational instructions can, when executed by one or more processing modules of one or more computing devices (e.g., one or more servers, one or more user devices) of the communication system 10, cause the one or more computing devices to perform any or all of the method steps described above.

It is noted that terminologies as may be used herein such as bit stream, stream, signal sequence, etc. (or their equivalents) have been used interchangeably to describe digital information whose content corresponds to any of a number of desired types (e.g., data, video, speech, audio, etc. any of which may generally be referred to as 'data').

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may also be used herein, the terms "processing module", "processing circuit", "processor", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, and/or any device that stores digital information. The memory device may be in a form a solid state memory, a hard drive memory, cloud memory, thumb drive, server memory, computing device memory, and/or other physical medium for storing digital information.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, and/or any device that stores digital information. The memory device may be in a form a solid state memory, a hard drive memory, cloud memory, thumb drive, server memory, computing device memory, and/or other physical medium for storing digital information.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A method for execution by a processing module of a computing device of one or more computing devices of a computing system, the method comprises:
   determining desired financial attributes of a legacy financial system, wherein the legacy financial system is supported by a legacy asset base, wherein the legacy asset base includes a plurality of legacy assets associated with a plurality of legacy asset types, and wherein the plurality of legacy assets is to provide favorable support for a plurality of ongoing financial obligations in accordance with the desired financial attributes;
   selecting, in accordance with the desired financial attributes, a subset of augmenting assets from a plurality of available augmenting assets to produce selected augmenting assets, wherein each available augmenting asset assigns a future time-estimated benefit payment and a series of time-certain obligated payments to a common entity, wherein the selected augmenting assets is associated with a fair market value;
   splitting each of the selected augmenting assets to produce an augmenting asset bundle by:
      reassigning the future time-estimated benefit payment of each selected augmenting asset from the common entity of the selected augmenting asset to a benefit entity, wherein an aggregate of the future time-estimated benefit payment of each selected augmenting asset is associated with a benefit net present value, and
      reassigning the series of time-certain obligated payments of each selected augmenting asset from the common entity of the selected augmenting asset to a sponsor entity, such that a beneficial valuation elevation is created where a sum of the benefit net present value and a liability net present value is greater than the fair market value of the selected augmenting assets, wherein an aggregate of each series of time-certain obligated payments of each selected augmenting asset is associated with the liability net present value; and
   assigning, in accordance with the desired financial attributes, a first portion of the benefit entity to the legacy asset base, so that the legacy financial system provides more favorable support for the plurality of ongoing financial obligations due to the beneficial valuation elevation over direct utilization of the selected augmenting assets.

2. The method of claim 1 further comprises:
   assigning a remaining portion of the benefit entity to the sponsor entity.

3. The method of claim 1 further comprises:
   detecting availability of a first future time-estimated benefit payment of the augmenting asset bundle; and facilitating a payment transaction of the first future time-estimated benefit payment from an associated payer to the legacy asset base.

4. The method of claim 1, wherein the desired financial attributes comprise one or more of:
  a desired cash flow level associated with the plurality of ongoing financial obligations;
  a desired timing of the desired cash flow;
  a current valuation of the legacy asset base;
  a desired valuation of the legacy asset base;
  a desired valuation lift of the legacy asset base;
  a desired minimum rate of return for each legacy asset type associated with the plurality of legacy assets; and
  a maximum risk level for each legacy asset type associated with the plurality of legacy assets.

5. The method of claim 1, wherein the determining the desired financial attributes comprises one or more of:
  establishing a desired valuation lift of the legacy asset base in accordance with a difference between a desired valuation of the legacy asset base and a current valuation of the legacy asset base when the desired valuation of the legacy asset base is greater than the current valuation of the legacy asset base;
  identifying, for at least one unfavorably-performing legacy asset of the plurality of legacy assets, an associated level of desired support for the plurality of ongoing financial obligations;
  analyzing a level of favorable support for the plurality of ongoing financial obligations to produce the desired financial attributes; and
  interpreting an input to produce the desired financial attributes.

6. The method of claim 1, wherein the selecting the subset of augmenting assets from the plurality of available augmenting assets to produce the selected augmenting assets comprises:
  determining, for each augmenting asset of the plurality of available augmenting assets, a valuation difference, wherein the valuation difference is a difference between a fair market value and a net present value;
  ranking the plurality of available augmenting assets based on the valuation difference associated with each augmenting asset to produce a rank ordered list of available augmenting assets; and
  selecting the subset of augmenting assets based on the rank ordered list of available augmenting assets, wherein financial aspects of the subset of augmenting assets compares favorably to the desired financial attributes.

7. The method of claim 6, wherein the selecting of the subset of augmenting assets based on the rank ordered list further comprises one or more of:
  analyzing the rank ordered list to identify available augmenting assets associated with a greatest level of valuation difference;
  analyzing the rank ordered list to identify available augmenting assets associated with a maximum desired level of fair market value;
  analyzing the rank ordered list to identify available augmenting assets associated with a minimum desired level of net present value;
  selecting a number of available augmenting assets such that a sum of the fair market values of the selected available augmenting assets compares favorably to a desired valuation lift of the legacy asset base; and
  selecting another number of available augmenting assets such that a sum of the net present values of the selected available augmenting assets compares favorably to a desired maximum aggregate net present value.

8. The method of claim 1, wherein the selecting the subset of augmenting assets from the plurality of available augmenting assets to produce the selected augmenting assets further comprises one or more of:
  identifying the subset of augmenting assets associated with favorable support of a desired cash flow level for the plurality of ongoing financial obligations;
  identifying the subset of augmenting assets associated with a desired timing of the desired cash flow level for the plurality of ongoing financial obligations;
  identifying the subset of augmenting assets associated with a desired valuation of the legacy asset base;
  identifying the subset of augmenting assets associated with a desired minimum rate of return for the augmenting asset bundle; and
  identifying the subset of augmenting assets associated with a desired maximum risk level for the augmenting asset bundle.

9. The method of claim 1, wherein the assigning the first portion of the benefit entity to the legacy asset base comprises one or more of:
  selecting the subset of augmenting assets of the augmenting asset bundle such that a value of the first portion of the benefit entity compares favorably to a desired valuation lift of the legacy asset base; and
  selecting the subset of augmenting assets of the augmenting asset bundle such that a value of a remaining portion of the benefit entity compares favorably to the liability net present value associated with the augmenting asset bundle.

10. A computer readable memory comprises:
  a first memory element that stores operational instructions that, when executed by a processing module causes the processing module to:
    determine desired financial attributes of a legacy financial system, wherein the legacy financial system is supported by a legacy asset base, wherein the legacy asset base includes a plurality of legacy assets associated with a plurality of legacy asset types, and wherein the plurality of legacy assets is to provide favorable support for a plurality of ongoing financial obligations in accordance with the desired financial attributes;
  a second memory element that stores operational instructions that, when executed by a processing module causes the processing module to:
    select, in accordance with the desired financial attributes, a subset of augmenting assets from a plurality of available augmenting assets to produce selected augmenting assets, wherein each available augmenting asset assigns a future time-estimated benefit payment and a series of time-certain obligated payments to a common entity, wherein the selected augmenting assets is associated with a fair market value;
  a third memory element that stores operational instructions that, when executed by a processing module causes the processing module to:
    split each of the selected augmenting assets to produce an augmenting asset bundle by:
      reassigning the future time-estimated benefit payment of each selected augmenting asset from the common entity of the selected augmenting asset to a benefit entity, wherein an aggregate of the future time-estimated benefit payment of each selected augmenting asset is associated with a benefit net present value, and reassigning the series of time-certain obligated payments of each selected augmenting asset from the common entity of the selected augmenting asset to a sponsor entity, such that a beneficial valuation elevation is created where a sum of the benefit net present value and a liability net present value is greater than the fair market value of the selected augmenting assets, wherein an aggregate of each series of time-certain obligated payments of each selected augmenting asset is associated with the liability net present value; and a fourth memory element that stores operational instructions that, when executed by a processing module causes the processing module to:

assign, in accordance with the desired financial attributes, a first portion of the benefit entity to the legacy asset base, so that the legacy financial system provides more favorable support for the plurality of ongoing financial obligations due to the beneficial valuation elevation over direct utilization of the selected augmenting assets.

11. The computer readable memory of claim 10 further comprises:

a fifth memory element that stores operational instructions that, when executed by a processing module causes the processing module to:

assign a remaining portion of the benefit entity to the sponsor entity.

12. The computer readable memory of claim 10 further comprises:

a fifth fourth memory element that stores operational instructions that, when executed by a processing module causes the processing module to:

detect availability of a first future time-estimated benefit payment of the augmenting asset bundle; and facilitate a payment transaction of the first future time-estimated benefit payment from an associated payer to the legacy asset base.

13. The computer readable memory of claim 10, wherein the desired financial attributes comprise one or more of:

a desired cash flow level associated with the plurality of ongoing financial obligations;

a desired timing of the desired cash flow;

a current valuation of the legacy asset base;

a desired valuation of the legacy asset base;

a desired valuation lift of the legacy asset base;

a desired minimum rate of return for each legacy asset type associated with the plurality of legacy assets; and a maximum risk level for each legacy asset type associated with the plurality of legacy assets.

14. The computer readable memory of claim 10 further comprises:

the first memory element further stores operational instructions that, when executed by the processing module, causes the processing module to determine the desired financial attributes by one or more of:

establishing a desired valuation lift of the legacy asset base in accordance with a difference between a desired valuation of the legacy asset base and a current valuation of the legacy asset base when the desired valuation of the legacy asset base is greater than the current valuation of the legacy asset base;

identifying, for at least one unfavorably-performing legacy asset of the plurality of legacy assets, an associated level of desired support for the plurality of ongoing financial obligations;

analyzing a level of favorable support for the plurality of ongoing financial obligations to produce the desired financial attributes; and interpreting an input to produce the desired financial attributes.

15. The computer readable memory of claim 10 further comprises:

the second memory element further stores operational instructions that, when executed by the processing module, causes the processing module to select the subset of augmenting assets from the plurality of available augmenting assets to produce the selected augmenting assets by one or more of:

determining, for each augmenting asset of the plurality of available augmenting assets, a valuation difference, wherein the valuation difference is a difference between a fair market value and a net present value;

ranking the plurality of available augmenting assets based on the valuation difference associated with each augmenting asset to produce a rank ordered list of available augmenting assets; and selecting the subset of augmenting assets based on the rank ordered list of available augmenting assets, wherein financial aspects of the subset of augmenting assets compares favorably to the desired financial attributes.

16. The computer readable memory of claim 15 further comprises:

the second memory element further stores operational instructions that, when executed by the processing module, causes the processing module to select of the subset of augmenting assets based on the rank ordered list by one or more of:

analyzing the rank ordered list to identify available augmenting assets associated with a greatest level of valuation difference;

analyzing the rank ordered list to identify available augmenting assets associated with a maximum desired level of fair market value;

analyzing the rank ordered list to identify available augmenting assets associated with a minimum desired level of net present value;

selecting a number of available augmenting assets such that a sum of the fair market values of the selected available augmenting assets compares favorably to a desired valuation lift of the legacy asset base; and selecting another number of available augmenting assets such that a sum of the net present values of the selected available augmenting assets compares favorably to a desired maximum aggregate net present value.

17. The computer readable memory of claim 10 further comprises:

the second memory element further stores operational instructions that, when executed by the processing module, causes the processing module to select the subset of augmenting assets from the plurality of available augmenting assets to produce the selected augmenting assets by one or more of:

identifying the subset of augmenting assets associated with favorable support of a desired cash flow level for the plurality of ongoing financial obligations;

identifying the subset of augmenting assets associated with a desired timing of the desired cash flow level for the plurality of ongoing financial obligations;

identifying the subset of augmenting assets associated with a desired valuation of the legacy asset base;

identifying the subset of augmenting assets associated with a desired minimum rate of return for the augmenting asset bundle; and identifying the subset of augmenting assets associated with a desired maximum risk level for the augmenting asset bundle.

18. The computer readable memory of claim 10 further comprises:

the fourth memory element further stores operational instructions that, when executed by the processing module, causes the processing module to assign the first portion of the benefit entity to the legacy asset base by one or more of:

selecting the subset of augmenting assets of the augmenting asset bundle such that a value of the first portion of the benefit entity compares favorably to a desired valuation lift of the legacy asset base; and selecting the subset of augmenting assets of the augmenting asset bundle such that a value of a remaining portion of the benefit entity compares favorably to the liability net present value associated with the augmenting asset bundle.

\* \* \* \* \*